US012108256B2

(12) United States Patent
Okuno

(10) Patent No.: US 12,108,256 B2
(45) Date of Patent: Oct. 1, 2024

(54) COMMUNICATION SYSTEM, COMMUNICATION DEVICE, TRANSMISSION METHOD, AND NON-TRANSITORY COMPUTER-READABLE RECORDING MEDIUM FOR COMMUNICATION DEVICE

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 50 days.

(21) Appl. No.: 17/709,625

(22) Filed: Mar. 31, 2022

(65) Prior Publication Data
US 2022/0322096 A1    Oct. 6, 2022

(30) Foreign Application Priority Data

Mar. 31, 2021   (JP) .................................. 2021-060501

(51) Int. Cl.
*H04W 12/47*   (2021.01)
*H04L 9/32*    (2006.01)
*H04W 4/80*    (2018.01)
*H04W 12/06*   (2021.01)

(52) U.S. Cl.
CPC ........... *H04W 12/47* (2021.01); *H04L 9/3228* (2013.01); *H04W 4/80* (2018.02); *H04W 12/06* (2013.01)

(58) Field of Classification Search
CPC .................................................... H04W 12/47
See application file for complete search history.

(56) References Cited

U.S. PATENT DOCUMENTS

| 2015/0036170 A1* | 2/2015 | Miyake | G06F 3/1238 |
| | | | 358/1.14 |
| 2016/0021116 A1* | 1/2016 | Maguire | H04L 63/08 |
| | | | 726/4 |
| 2016/0179449 A1* | 6/2016 | Cho | G06F 3/1238 |
| | | | 358/1.15 |

(Continued)

FOREIGN PATENT DOCUMENTS

| JP | 2013187567 A | 9/2013 |
| JP | 2019139494 A | 8/2019 |

OTHER PUBLICATIONS

Wi-Fi Peer-to-Peer (P2P) Technical Specification Version 1.1, Wi-Fi Alliance Technical Committee P2P Task Group.

*Primary Examiner* — Wen W Huang
(74) *Attorney, Agent, or Firm* — Scully, Scott, Murphy & Presser, P.C.

(57) ABSTRACT

A terminal device is configured to transmit communication start notification for starting short-range wireless communication between a terminal device-side communication interface and a communication device-side communication interface. In response to the communication start notification, a communication device transmits authentication information of wireless communication and a printer one-time token to the terminal device via the short-range communication. The terminal device transmits connection information for connecting a router to the communication device via the wireless communication using the authentication information. The communication device performs setting for connecting the router using the connection information.

16 Claims, 7 Drawing Sheets

(56) References Cited

U.S. PATENT DOCUMENTS

| | | | |
|---|---|---|---|
| 2017/0094451 A1* | 3/2017 | Terashita | H04W 4/06 |
| 2017/0127276 A1* | 5/2017 | Koo | H04L 63/0807 |
| 2018/0124847 A1* | 5/2018 | Nishida | H04W 4/80 |
| 2018/0249313 A1* | 8/2018 | She | H04W 4/80 |
| 2019/0253401 A1 | 8/2019 | Asakura et al. | |
| 2019/0306160 A1* | 10/2019 | Zehler | G06F 21/608 |
| 2022/0021554 A1* | 1/2022 | Hwang | H04W 76/10 |

* cited by examiner

PRINTER MANAGEMENT TABLE PTB

| DEVICE ID | dv1 |
|---|---|
| PERMITTED NUMBER OF SHEETS FOR PRINTING | pr1 |
| INK REMAINING AMOUNT | ink1 |
| DEVICE SETTING | dc1 |

FIG. 2

SERVER MANAGEMENT TABLE STB

| DEVICE ID | dv1 | dv2 | dv3 |
|---|---|---|---|
| PERMITTED NUMBER OF SHEETS FOR PRINTING | pr1 | pr2 | pr3 |
| INK REMAINING AMOUNT | ink1 | ink2 | ink3 |

FIG. 3

COMMUNICATION SYSTEM, COMMUNICATION DEVICE, TRANSMISSION METHOD, AND NON-TRANSITORY COMPUTER-READABLE RECORDING MEDIUM FOR COMMUNICATION DEVICE

CROSS-REFERENCE TO RELATED APPLICATIONS

This application claims priority under 35 U.S.C. § 119 from Japanese Patent Application No. 2021-060501 filed on Mar. 31, 2021. The entire subject matter of the application is incorporated herein by reference.

BACKGROUND

The present disclosures relate to a communication system, a communication device, a transmission method, and a non-transitory computer readable recording medium containing computer-executable instructions for the communication device.

Conventionally, various techniques realizing a short-range wireless communication between a terminal device and a printer have been presented. According to one example of such techniques, when an error is occurred in a printer, the printer notifies the occurrence of the error via a communication compliant to the NFC (Near Field Communication) standard to a portable terminal device which has approached to the printer.

SUMMARY

Incidentally, from a security point of view, it is preferable that a terminal device, which is configured to transmit instructions to a communication device such as a printer to control operations thereof, is limited to a particular one. However, if a user is required to perform operations to limit the number of terminal devices that can transmit control instructions which are received and processed by the communication device, the workload for the user may increase.

According to aspects of the present disclosure, there is provide a communication system, including a terminal device, and a communication device. The terminal device includes a terminal device-side short-range wireless communication interface configured to perform a short-range wireless communication, a terminal device-side wireless communication interface configured to perform a first wireless communication which is a wireless communication different from the short-range wireless communication, and a terminal device-side controller. The communication device includes a communication device-side short-range wireless communication interface configured to perform the short-range wireless communication, a communication device-side wireless communication interface configured to perform the first wireless communication, and a communication device-side controller. The terminal device-side controller is configured to perform a communication starting process of executing the short-range wireless communication between the terminal device-side short-range wireless communication interface and the communication device-side short-range wireless communication interface. In response to execution of the communication starting process, the communication device-side controller is configured to perform a first identification information transmitting process of transmitting first connection information and first identification information to the terminal device-side short-range wireless communication interface using the communication device-side short-range wireless communication interface via the short-range wireless communication, the first connection information being used for connection of the first wireless communication, the first identification information being used to identify the terminal device that has performed the communication starting process. The terminal device-side controller is configured to perform a first control information transmitting process of transmitting first control information from the terminal device-side wireless communication interface to the communication device-side wireless communication interface via the first wireless communication using the first connection information obtained from the communication device by performing the first identification information transmitting process. The communication device-side controller is configured to perform a control process of controlling of the communication device based on the first control information obtained from the terminal device by executing the first control information transmitting process.

BRIEF DESCRIPTION OF THE DRAWINGS

FIG. 2 shows an example of a printer management table shown in FIG. 1.

FIG. 3 shows an example of a sever management table shown in FIG. 1.

DETAILED DESCRIPTION OF THE EMBODIMENTS

Configuration of Printing System 1

Figure 1:
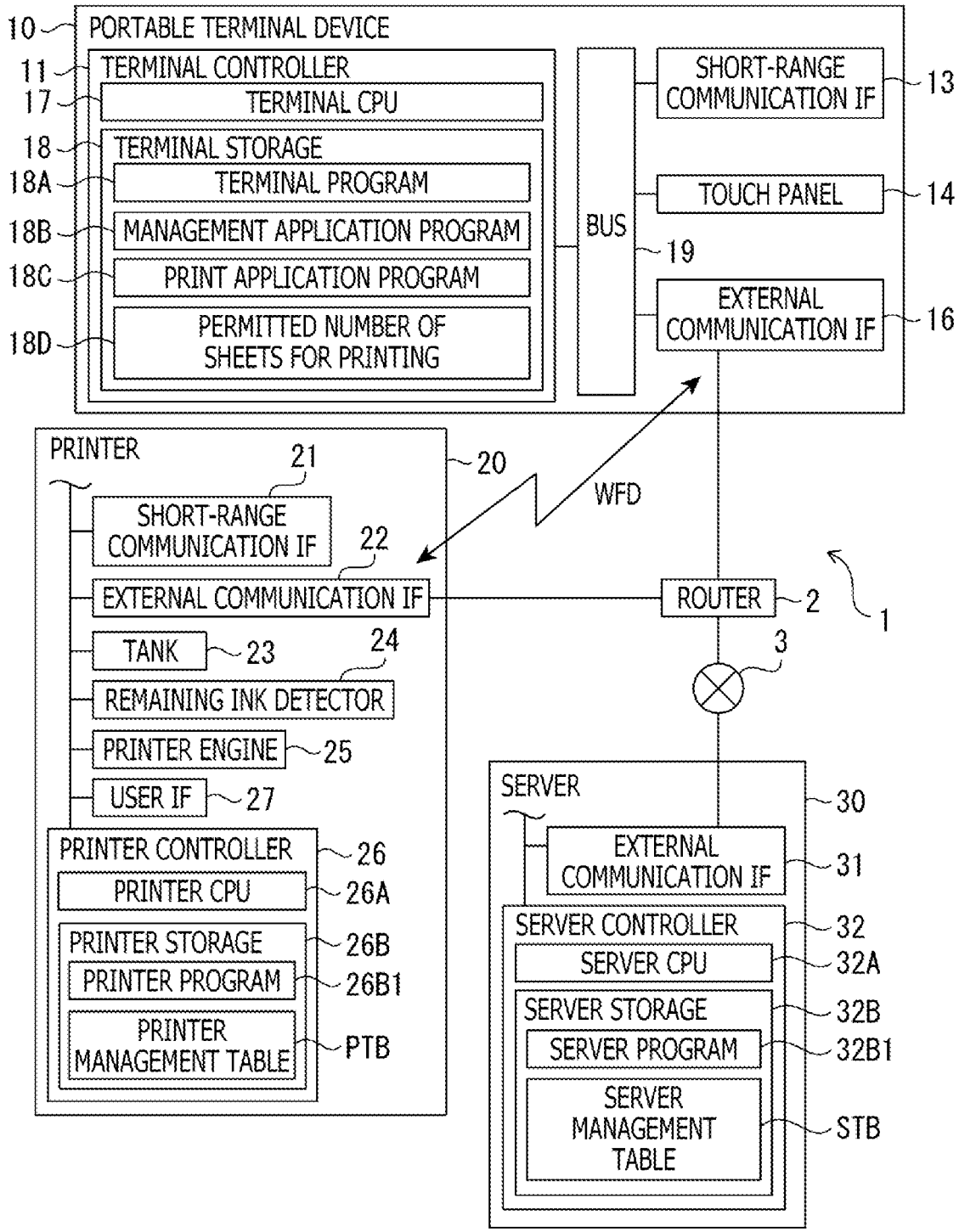
FIG. 1 is a block diagram illustrating a configuration of a printing system according to an embodiment.

A printing system 1 according to an embodiment of the present disclosures will be described with reference to the accompanying drawings. FIG. 1 is a block diagram showing a configuration of the printing system 1. The printing system 1 has, for example, a plurality of printers 20 and portable terminal devices 10, and is configured to provide printing services to users. According to the present embodiment, the printing service is a service that enables a user to print by charging the user for the permitted number of sheets, which is the number of sheets that can be used for printing by the printer 20. For example, by paying an initial fee when a user applies for this printing service, a particular number of sheets (e.g., 2000 sheets) is granted for the user as the permitted number of sheets. In the following explanation, setting the permitted number of sheets or increasing the permitted number of sheets by charging additionally may occasionally be referred to as "charging."

In the present embodiment, the printer 20 is an inkjet printer. The printer 20 shipped from a vender to the user is filled with a sufficient amount of ink to print more than the particular number of sheets (e.g., 2000 sheets plus something extra). Therefore, in the printing service, after the user has received the printer 20, the user does not need to fill the printer 20 with ink or replace the ink cartridge until the user prints the permitted number of sheets granted by paying the initial fee. Therefore, the printing service is a highly convenient service for the user.

When the user wants to print more than the particular number of sheets granted by the payment of the initial fee, the user pays an additional fee to purchase additional permitted number. Then, the user can continue to use the printer 20. When the remaining ink level of the printer 20 becomes low as the user repeatedly purchases the additional permitted number by repeatedly paying the initial fee, the user can apply for replacement of the printer 20. As the printer 20 is replaced in response to the request, the printing service can be continued.

As shown in FIG. 1, the printing system 1 includes a portable terminal device 10, a printer 20, and a server 30. It is noted that FIG. 1 shows only one portable terminal device 10 and one printer 20 to avoid complication of the drawing. However, as mentioned above, the printing system 1 may be configured to include multiple portable terminal devices 10 and/or a plurality of printers 20. The portable terminal device 10 and the printer 20 are connected to each other through a router 2 so that mutual communication is enabled therebetween. Further, the portable terminal device 10 and the printer 20 are connected to the server 30 via the router 2 and the Internet 3 so as to communicate with each other. It should be noted that the configuration of the network described above is only an example and can be modified in various ways. For example, the server 30 may be included in a LAN, and the portable terminal device 10 and printer 20 are connected to the server 30 without going through the Internet 3. Further, one or more portable terminal devices 10 and one or more printers 20 may be connected to the server 30. In addition, a single printer 20 may be shared and used by multiple portable terminal devices 10. Alternatively, a single portable terminal device 10 may use multiple printers 20.

Configuration of Portable terminal device 10

The portable terminal device 10 is configured to cause the printer 20 to print images on a printing sheet. The portable terminal device 10 is, for example, a smartphone. The portable terminal device 10 has a terminal controller 11, a short-range communication IF ("IF" being an abbreviation of "interface") 13, a touchscreen panel 14, and an external communication IF 16, which are configured to communicate with each other via a bus 19.

The terminal controller 11 has a terminal CPU 17 and a terminal storage 18. The terminal storage 18 includes a combination of, for example, a RAM, a ROM, and a flash memory. The terminal storage 18 contains a terminal program 18A, a management application program (hereinafter, the "application program" will be simply referred to as "application") 18B, a printing application 18C, and a permitted number 18E of sheets on which printing can be performed. The terminal program 18A, the management application 18B, the printing application 18C, and the permitted number 18D are stored, for example, in a rewritable ROM (e.g., a flash memory, an SSD or the like). The terminal program 18A is a program that integrally controls the portable terminal device 10, and includes the management application 18B, which provides basic functions and services to the management application 18B, and the printing application 18C. The terminal program 18A is, for example, Android (registered trademark) OS or iOS (registered trademark). When the portable terminal device 10 is a PC, the terminal program 18A may be Windows (registered trademark) OS.

The management application 18B and the printing application 18C are programs provided, for example, by the vender of the printer 20, and are configured to perform various processes for the printer 20 using functions of the terminal program 18A and the like. The management application 18B is a program configured to execute, for example, an instruction to register the printer 20 with the server 30, an instruction to set or increase the permitted number 18E which is set to the server 30 in accordance with the fee paid by the user. The printing application 18C is configured to execute setting instructions and printing instructions for the printer 20. It is noted that the management application 18B and the printing application 18C may be combined as a single application.

The terminal controller 11 executes the terminal program 18A, the management application 18B and the printing application 18C on the terminal CPU 17, thereby integrally controlling the portable terminal device 10. The permitted number 18D of the printing sheets is the information stored on the portable terminal device 10 and represents the permitted number of sheets used for printing by the printer 20 (see FIG. 2). The portable terminal 10 is configured to display the current permitted number 18E on a screen for receiving a print instruction to the printer 20.

In the following explanations, the terminal controller 11 which executes the terminal program 18A, the management application 18B, and the printing application 18C may be simply referred to by the name of the device. That is, a statement that "the portable terminal device 10 does . . . " may be intended to mean that "the terminal controller 11 that executes the terminal program 18A, the management application 18B, and the printing application 18C on the CPU 17 does . . . ." Further, in the specification, the processes of the terminal CPU 17 according to the instructions described in the program will be illustrated. That is, "determination," "transmission," and other processes in the following description represent the processes of the terminal CPU 17. It is noted that the processes by the terminal CPU 17 includes hardware control. Similarly, a printer controller 26 executing a printer program 26B1 with a printer CPU 26A may be expressed as "the printer 20 does . . . ," and a server controller 32 executing a server program 32B1 with a server CPU 32A may be expressed as "the server 30 does . . . ." In addition, "data" in this specification is represented by a computer-readable bit string, and data having the same substantive meaning content but different formats is treated as the same data. The same applies to "information" in this specification.

The terminal storage 18, in which programs (e.g., the terminal program 18A, the management application 18B, and the printing application 18C) are stored may be a computer-readable storage medium. The computer-readable storage medium is a non-transitory medium. The non-transitory storage medium is a non-transitory medium. The non-transitory medium includes, in addition to the above examples, recording media such as a CD-ROM and a DVD-ROM. It is noted that the non-transitory medium is also a tangible medium. On the other hand, an electrical signal carrying a program that is downloaded from a server on the Internet or the like is a signal medium, which is a kind of computer-readable medium, but not included in the non-transitory medium. In addition, the printer storage 26B, in which a printer program 26B1 (described later) is stored, and a server storage 32B, in which a server program 32B1 is stored may also be the computer-readable storage media which are the non-transitory media.

The short-range communication IF 13 is a communication interface capable of performing a short-range wireless communication according to the NFC (Near Field Communication) standard. It should be noted that the short-range wireless communication performed by the short-range communication IF 13 is not limited to that compliant to the NFC standard, but the short-range communication according to other communication standards such as Bluetooth (registered trademark). The touchscreen panel 14 has a liquid crystal panel and a contact sensing film attached onto the surface of the liquid crystal panel, and changes display contents on the liquid crystal panel according to the control of the terminal controller 11. In addition, the touchscreen panel 14 is configured to receive a user's operation input, and outputs signals corresponding to the operation input to the terminal controller 11. It is noted that the portable terminal device 10 may have operation buttons such as a power button and the like in addition to the touchscreen panel 14. It is noted that the user interface equipped to the portable terminal device 10 is not necessarily limited to the touchscreen panel 14. That is, the portable terminal device 10 may further have a display device such as an LCD or an Organic Electroluminescent Display, and input devices such as a pushbutton switch, a slide switch and the like.

The external communication IF 16 is a communication interface capable of performing a wireless communication compliant, for example, to the Wi-Fi (registered trademark) communication standard. The portable terminal device 10 is connected to a router 2 via the external communication IF 16. The router 2 is connected to the server 30 via the Internet 3. It is noted that, instead of or in addition to the wireless communication interface, the external communication section 16 may have a wired communication interface to which a cable such as a LAN cable is connectable.

Configuration of Printer 20

The printer 20 is a color printing device configured to perform printing on a printing sheet (which is an example of a recording medium) in accordance with, for example, the inkjet printing method. The printer 20 has the short-range communication IF ("IF" being an abbreviation of "IF") 21, an external communication IF 22, a tank 23, a remaining ink detector 24, a print engine 25, a user IF 27, and the printer controller 26. The short-range communication IF 21 is a communication IF capable of performing the short-distance wireless communication in accordance with, for example, the NFC standard. It should be noted that the short-distance wireless communication performed by the short-range communication IF 21 is not necessarily limited to the NFC, but another short-range communication in accordance with, for example, Bluetooth (registered trademark). The printer 20 is configured to communicate with the short-range communication IF 13 via the short-range communication IF 21. The printer 20 is configured to communicate with the short-range communication IF 13 via the short-range communication IF 21, and obtain setting information and printing instructions from the portable terminal device 10. It is noted that the terms "obtain" and "acquire" in this specification are used in a concept that does not require a request. That is, a process of receiving an instruction or information from the printer 20 without requesting for such an instruction or information is included in the concept of "acquiring" or "obtaining" an instruction or information from the printer 20.

The external communication IF 22 has, for example, a communication interface configured to perform a wireless communication in accordance with the Wi-Fi (registered trademark) communication standard, and a wired communication interface configured to connect to a LAN cable. The printer 20 is connected to the router 2 via the external communication IF 22. It is noted that the external communication IF 22 may be configured with only one of the wireless communication interface or the wired communication interface.

The tank 23 is a device in which ink is stored. In the present embodiment, there are four kinds (i.e., magenta abbreviated as M, cyan abbreviated as C, yellow abbreviated as Y, and black abbreviated BK) of inks, and a plurality of tanks 23 are provided for respective kinds of the inks. In other words, the printer 20 uses a plurality of tanks 23 in which the four kinds of inks are stored respectively and independently. The printer 20 may be a printer configured to perform monochromatic printing. In such a case, the tank may be configured to store only one kind of (i.e., one color of) ink. In the present embodiment, when the printer 20 is supplied from the vender to the user, each of the plurality of tanks 23 is filled with the ink enabling printing of a particular number of sheets when, for example, a single color coverage is regarded as 5%. The particular number is the number greater than a printable number assigned to the user who has applied for the printing service, and the particular number can be set arbitrarily by the vender who provides the printing service.

The tank 23 is provided such that the tank 23 cannot be filled with ink by the user. Concretely, the tank 23 is arranged at a position where the user cannot touch the tank 23. Further, the tank 23 is fixed to the printer 20 such that the user cannot detach or attach the tank 23 from/to the printer 20. The remaining ink detector 24 is configured to detect the remaining amount of the ink (i.e., the amount of the ink remained in the tank 23). The remaining ink detector 24 is an optical sensor, which arranged at the tank 23 to detect the height of the surface of the ink stored in the tank 23. It is noted that the remaining ink detector 24 is provided to each tank 23 to detect the remaining amount of the ink in each tank 23. It is noted that the printer 20 may be configured such that the user can replace the tank 23.

The print engine 25 is configured to perform printing using the ink stored in the tank 23. The print engine 25 is provided with, for example, an inkjet head and perform printing, in accordance with the well-known inkjet printing method, based on image data included in a print instruction obtained from the portable terminal device 10. The user IF 27 includes, for example, a touchscreen panel, a power button and the like which function to receive operation inputs by the user and/or display various pieces of information. It is noted that the printer 20 may be configured such that some members of the user IF 27 (e.g., the touchscreen panel and the like) are not provided.

The printer controller 26 is configured to integrally control the printer 20. The printer controller has a printer CPU 26A and a printer storage 26B. the printer CPU 26A controls operations of the printer by executing the printer program 26B1 stored in the printer storage 26B. The printer program 26B1 is a program configured to integrally control the printer 20, and cause, when executed, the printer 20 to perform various processes. The printer storage 26B is configured, for example, by combining a RAM, a ROM, a flash memory, and an HDD. The printer program 26B1 is stored in a rewritable ROM (e.g., a flash memory) of the printer storage 26B.

In the printer storage 26B, a printer management table PTB is stored. The printer management table PTB is stored, for example, in a rewritable ROM. The printer management table PTB is data in which information about the printer 20 is stored with respect to the use of the printing service. As shown in FIG. 2, the printer management table PTB stores a device ID, the permitted number of sheets for which printing can be performed, an amount of remaining ink, and the device settings in an associated manner. The device ID is, for example, a serial number set by the vender of the printer 20, and is unique information that can identify a given printer 20 from other printers 20. The device ID is not necessarily limited to the serial number, but can be other information such as the MAC address of the short-range communication IF 21 or the external communication unit 22.

The permitted number of sheets indicates the printable number of sheets by the printer 20. The user who uses the printer 20 is permitted to perform printing within a range of the permitted number of sheets which is stored in the printer management table PTB. The permitted number of sheets can be increased (i.e., charged) by an amount corresponding to the amount fees charged to the user. It is noted that the permitted number of sheets is decremented by the number of sheets used as the printing by the printer 20 is performed. When, for example, the permitted number of sheets becomes zero or less, the printer 20 is unable to perform printing. The printer 20 executes printing each time a print instruction is received, subtracts the number of printed sheets from the permitted number of sheets, and keep printing until the permitted number of sheets becomes zero. When the permitted number of sheets reaches zero, the printer 20 prohibits printing and notifies the portable terminal device 10 of an occurrence of an error. When the number of sheets to be printed instructed by the print instruction is more than the permitted number of sheets when the printer 20 receives the print instruction, the printer 20 may notify the portable terminal device 10 of the error without performing the printing, but storing the number of sheets that can be printed.

The ink remaining amount indicates the remaining amount of the ink detected by the remaining ink detector unit 24. After performing operations to use the ink (e.g., refilling of the ink to the inkjet head, checking of nozzles of the inkjet head, printing), the ink remaining amount detected by the remaining ink detector 24 is stored in the printer management table PTB. The device setting is setting information of functions (e.g., the print function) of the printer 20, various functional settings (e.g., a sheet size, a color setting, a magnification setting) and language to be used to display information on the user interface 27.

The contents of the printer management table PTB shown in FIG. 2 are examples. The printer management table PTB may contain activation information to be managed by the server 30. The activation information here means, for example, information that allows the print engine 25 to perform printing when set to the "on" state by the server 30, while restricts the print engine 25 to perform printing when set to the "off" state. By setting the state of the activation information, the server 30 can control the printing processes of the multiple printers 20, respectively.

Configuration of Server 30

As shown in FIG. 1, the server 30 has an external communication IF 31 and a server controller 32. The external communication IF 31 is configured to execute a communication with the portable terminal devices 10 and the printers 20 connected via the Internet 3. The server controller 32 has a server CPU 32A and a server storage 32B. The server control unit 32 has a server CPU 32A and a server storage 32B. The server CPU 32A executes a server program 32B1 in the server storage 32B to integrally control operations of the server 30. The server program 32B1 is a program that integrally controls the server 30, and is configured to cause the server 30 to execute various processes.

The server storage 32B has a combination of a RAM, a ROM, a flash memory, an HDD, and the like. The server management table STB is stored in the server storage 32B. The server management table STB is data containing information necessary for using the printing service. In the server management table STB, the information of the printers 20 that use the printing service is stored in association with device IDs of the respective printers 20, and is managed by the vender.

As shown in FIG. 3, in the server management table STB, the device ID, the permitted number of sheets on which printing can be performed, and the ink remaining amount. It is noted that the device ID, the permitted number of sheets, and the ink remaining amount are the same data as in the printer management table PTB described above. Therefore, the data of the printer management table PTB corresponding to the same device ID is stored as the server management table STB. The server 30 according to the present embodiment is configured to manage the permitted number of sheets printable by each printer 20 by means of the server management table STB in which the device IDs and the permitted numbers of sheets are associated for the multiple printers 20. The server 30 performs a process of synchronizing the permitted number of sheets, which increases or decreases in response to the printing or charging instructions from the portable terminal device 10, with the printer 20, and manages the latest permitted number of sheets with use of the server management table STB. In addition, the server 30 collects the latest information on the ink remaining amount from the printer 20 by performing the synchronization process. The server 30 may, for example, notify the portable terminal device 10 to replace the printer 20 when the ink remaining amount falls below a particular threshold. According to such a configuration, the user is enabled to apply for the replacement of the printer 20 and receive a new printer 20 before the ink remaining amount of the printer 20 in use runs out and printing becomes impossible.

Wireless Controlling Process

Next, operations of the user in the wireless controlling process performed between the portable terminal device 10 and the printer 20, and processed performed therein will be described. When, for example, the user bought the printer 20 first time, and the printer 20 has arrived from the vender, the printer 20 performs the processes shown in FIG. 5. The portable terminal device 10, the printer 20, and the server 30 execute respective processes based on operations of the user. In the sequence diagrams in FIG. 4 onward, operations by the user are indicated by obliquely downward arrows. Further, the order and the order and the contents of the processes and/or operations on FIG. 4 onward are only examples. In the following description, a case where the printer 20 of which device ID is "dv1" (see FIG. 2) is used will be described.

Figure 4:
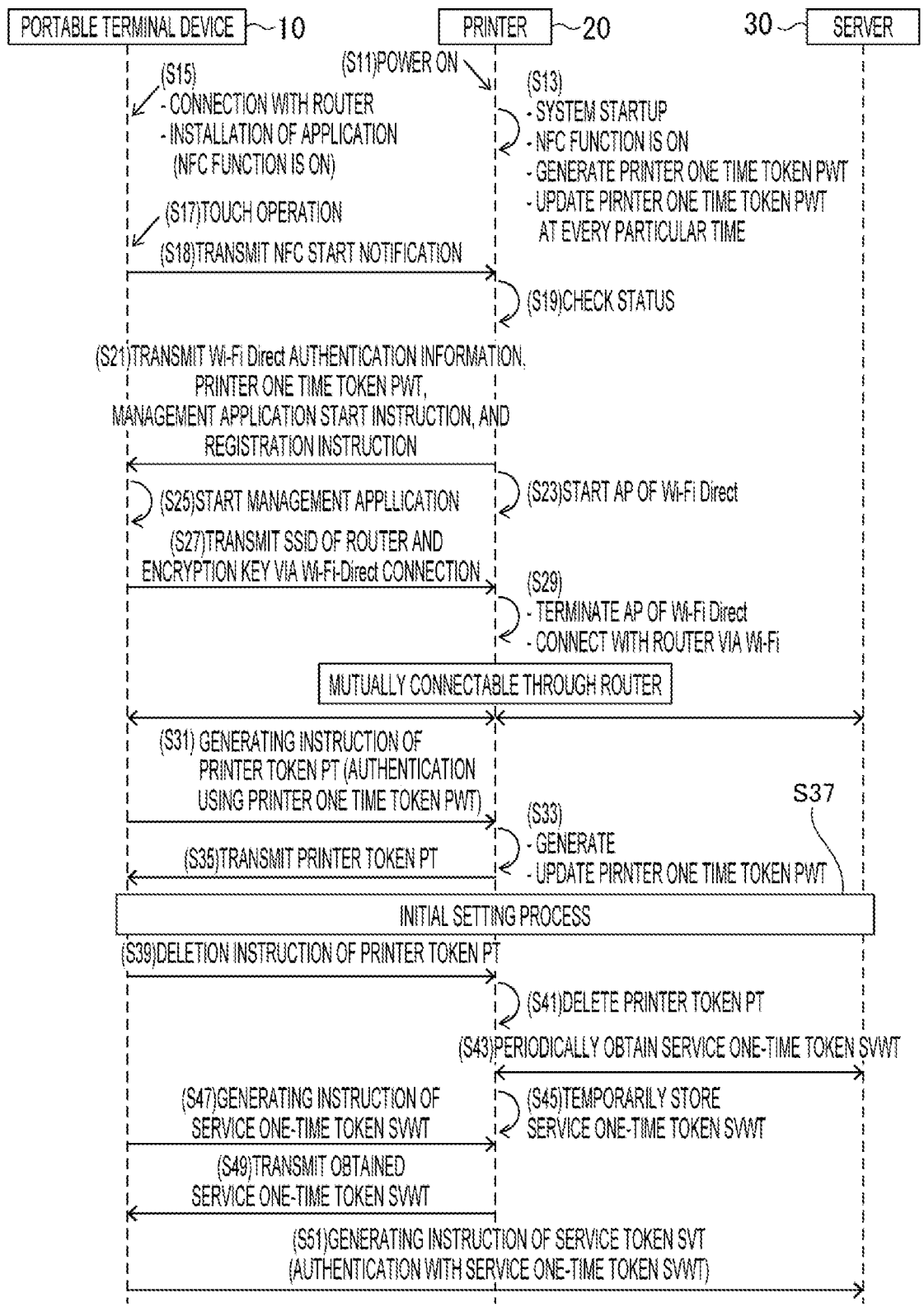
FIG. 4 is a sequence diagram in a case where a wireless control process is performed.

Initially, the user powers on the printer 20 (S11 of FIG. 4). When the printer 20 is powered on, the printer 20 executes the printer program 26B1 with the printer CPU 26A and invokes the system of the printer 20 (S13). Further, when the system is invoked, the printer 20 activates the function of the NFC communication (S13). Accordingly, the printer 20 becomes capable of performing the NFC communication with the portable terminal device 10. It is noted that the printer 20 may be configured such that the NFC communication function is not activated until the printer 20 receives a user operation therefor.

The printer 20 generates a printer one-time token PWT (S13). As will be described later, the printer 20 and the server 30 according to the present embodiment are configured to generate a token as information used to identify a communication destination (e.g., the portable terminal device 10). As the token, a character string which is a combination of numerals and alphabets may be employed. The printer 20 and the server 30 can suppress an occurrence of spoofing, data leakage, and data tampering by transmitting the token to the communication destination, and thereafter, performing an authentication using the token transmitted in the communication with the communication destination. For example, the communication destination which has received the token from the printer 20 or the like attaches the token to data when the communication destination transmits the data to the printer 20 or the server 30, thereby proving that the communication destination is the device which has received the token. The printer 20 or the like determines that the communication destination is the authenticated device when the token received from the communication destination coincides with the token the printer 20 or the like has.

It is noted that the printer 20 or the server 30 may not need to generate the token every time when the token becomes necessary. For example, the printer 20 or the server 30 may generate multiple tokens in accordance with the number of communication destinations in advance, and selects a token to be used from among the tokens having been generated. In other words, the printer 20 or the server 30 may not generate a token every time when it becomes necessary, but performs a setting process to select a token from among the tokens having been generated in advance and associates the selected token with the communication destination. Further, how to use the token is not necessarily limited to a method of examining coincidence of the tokens described above. The printer 20 or the like may be configured to determine that the authentication is successful even if the character strings of the tokens do not match perfectly, for example, even if there are differences in uppercase and lowercase letters. Alternatively, the printer 20 or the like may determine that the authentication is successful when the hash value generated based on the authentication information obtained from the communication destination matches the hash value held by the printer 20 itself. Further alternatively, the printer 20 or the like may also perform encryption of data using the token and determine that the communication destination has been successfully authenticated based on the fact that the data has been successfully decrypted.

The one-time token, for example, has a relatively short validity period compared to a token, and is used to authenticate the communicating destination in the communication before the token is generated. By shortening the validity period of the one-time token, even if the number of characters in the one-time token is shortened, the security level can be maintained since the opportunity (time to attempt) for authentication through the generation of illegal tokens such as random or brute force. The printer 20 can, for example, update the printer one-time token PWT to be used every particular time (e.g., one hour) to ensure that the valid printer one-time token PWT is changed (S13).

On the other hand, the user performs setting of the portable terminal device 10 (S15). For example, the user enters an SSID and an encryption key of the router 2 by operating the touchscreen panel 14 to connect the external communication IF 16 of the portable terminal device 10 and the router 2 with the Wi-Fi (registered trademark) (S15). The user operates the touchscreen panel 14 to install the management application 18B and the printing application 18C (S15). As the management application 18B and the printing application 18C are installed in the portable terminal device 10, the NFC communication function using the management application 18B and/or the printing application 18C is activated. It should be noted that the portable terminal device 10 may be configured such that the NFC communication function is not automatically activated, but kept deactivated until receiving the user operation for activation.

After installing the management application 18B and the like, the user performs a touch operation, which is an operation of bringing the short-range communication IF 13 of the portable terminal device 10 close to the short-range communication IF 21 of the printer 20 (S17). On the other hand, on the printer 20 side, when the NFC communication function is activated in S13, the printer 20 transmits radio waves (or generates magnetic fields) from the short-range communication IF 13 to perform polling. When receiving the radio waves from the printer 20 (or when an induced current flows due to electromagnetic induction), the portable terminal device 10 transmits a start notification to start the NFC communication to the printer 20 (S18). The portable terminal device 10 transmits, for example, in the starting notification, information necessary for the NFC communication (e.g., NFCID and the like) to the printer 20.

When the printer 20 obtains the start notification output in S18 and detects that the wireless terminal capable of performing the NFC communication is brought close to the short-range communication IF 21 by the touch operation, the printer 20 checks the status of the printer itself (S19). The printer 20 transmits information corresponding to the status of the printer 20 itself in response to the touch operation of (21). For example, the status in FIG. 4 shows that the printer 20 is in a status where the printer 20 has been shipped from the vender, and a registration process (which will be described later) to register the printer 20 with the server 30 has not been performed. Therefore, in S21, the printer 20 transmits information instructing the startup of the management application 18B and a registration instruction instructing the management application 18B to register the printer 20 with the server 20.

It is noted that the printer 20 may not perform a process in S19 to determine the status of the printer 20 itself based on the wireless terminal device capable of performing the NFC communication being brought close to the printer 20. In such a case, the printer 20 may transmit, in S21, only Wi-Fi Direct authentication information (described later) or the printer one-time token PWT.

In a status shown in FIG. 4, the printer 20 in a status where settings of the external communication IF 22 have not been made, and the printer 20 has not connected to the router 2 or the Internet 3. Therefore, the printer 20 performs a process of obtaining information of the network to which the portable terminal device 10 is connected (e.g., information about the router 2) from the portable terminal device 10, and connecting the printer 20 to the network to which the portable portable terminal device 10 is connected.

Specifically, in S21, the printer 20 is configured to transmit Wi-Fi Direct authentication information and the printer one-time token PWT generated in S13 to the portable terminal device 10 via the NFC communication in S21. The Wi-Fi Direction authentication information is authentication information to realize the wireless communication in accordance with the Wi-Fi Direction (registered trademark) (hereinafter, referred to as "WFD") method. The WFD method is a wireless communication method described in standardized document "Wi-Fi Peer-to-peer (P2P) Technical Specification Version 1.1" which is the method for performing the wireless communication in compliant to the IEEE802.11 standard, and other similar standards (e.g., 802.11a, 802.11b, 802.11g, 802.11n and the like).

After transmitting the SSID and the encryption key to the portable terminal device 10 as the WFD authentication information, the printer 20 starts up the WFD application software (S23) and cause the external communication IF 22 of the printer 20 itself to function as the access point (see FIG. 1). The WFD application is included, for example, in the printer program 26B1. When the printer 20 detects an access to the access point using the SSID and the encryption key transmitted in S21, the printer 20 performs a P2P communication with the communication destination via the wireless communication in accordance with the WFD method (hereinafter, occasionally referred to as "WFD communication").

When obtaining the information instruction the startup and the like of the management application 18B in S21, the portable terminal device 10 starts the management application 18B (S25). For example, in S21, the printer 20 may transmits an application ID (an example of information to be used in the registration process) as information instructing the startup and the like to the portable terminal device 10. The application ID is information to identify the application in Android (registered trademark) OS or iOS (registered trademark). More concretely, the application ID is the information for uniquely identifying an application (e.g., "com.example.xxx") used by the Android (registered trademark) OS or the iOS (registered trademark). The application such as the management application 18B is uniquely identified by the device (e.g., the portable terminal device 10) or in the application distribution service (e.g., Play Store of Google Inc. or App Store of Apple Inc.).

By obtaining the application ID of the management application 18B in S21, if the management application 18B has already been installed, the portable terminal device 10 starts the management application 18B. If the management application 18B has not yet installed, the portable terminal device 10 displays a message such as "do you want to install management application?" on the touchscreen panel 14. Alternatively, the portable terminal device 10 displays a web page such as a page of the App Store for installing the management application 18B on the touchscreen panel 14. It is noted that the information instructing the startup or the like of the management application 18B is not necessarily limited to the application ID described above. The information instructing the startup or the like may be, for example, a URL of a server of the vender of the printer 20, a URL of a website of a distribution service of the management application 18B. Alternatively, the portable terminal device 10 may starts the management application 18B not by the instruction from the printer 20 but in accordance with the user operation.

When the portable terminal device 10 starts the management application 18B in S25, the portable terminal device 10 performs the WFD communication with the printer 20 via the management application 18B (S27). The portable terminal device 10 executes the process in S27 onward with the management application 18B. The portable terminal device 10 accesses from the external communication IF 16 to the external communication IF 22 (access point) of the printer 20 using the obtained SSID and the encryption key of the WFD obtained in S21 (S27). The printer 20 performs the authentication process using the SSID and the encryption key obtained in S27, performs the WFD communication with the portable terminal device 10 when it is determined that authentication is successful. In this way, the external communication IF 16 of the portable terminal device 10 and the external communication IF 22 of the printer 20 via the WFD communication.

The portable terminal device 10 transmits, in S27, the SSID and the encryption key of the router 2, that is, the connection information to connect with the network to which the portable terminal device 10 itself is connected to the printer 20. In S21, the portable terminal device 10 may transmit the connection information to the printer 20 on condition that the WFD authentication information is obtained from the printer 20. In this case, the printer 20 determines that the communication setting of the printer 20 itself has not been made (S19) and transmits the WEF authentication information to the portable terminal device 10, thereby obtaining the connection information from the portable terminal device 10.

Figure 5:
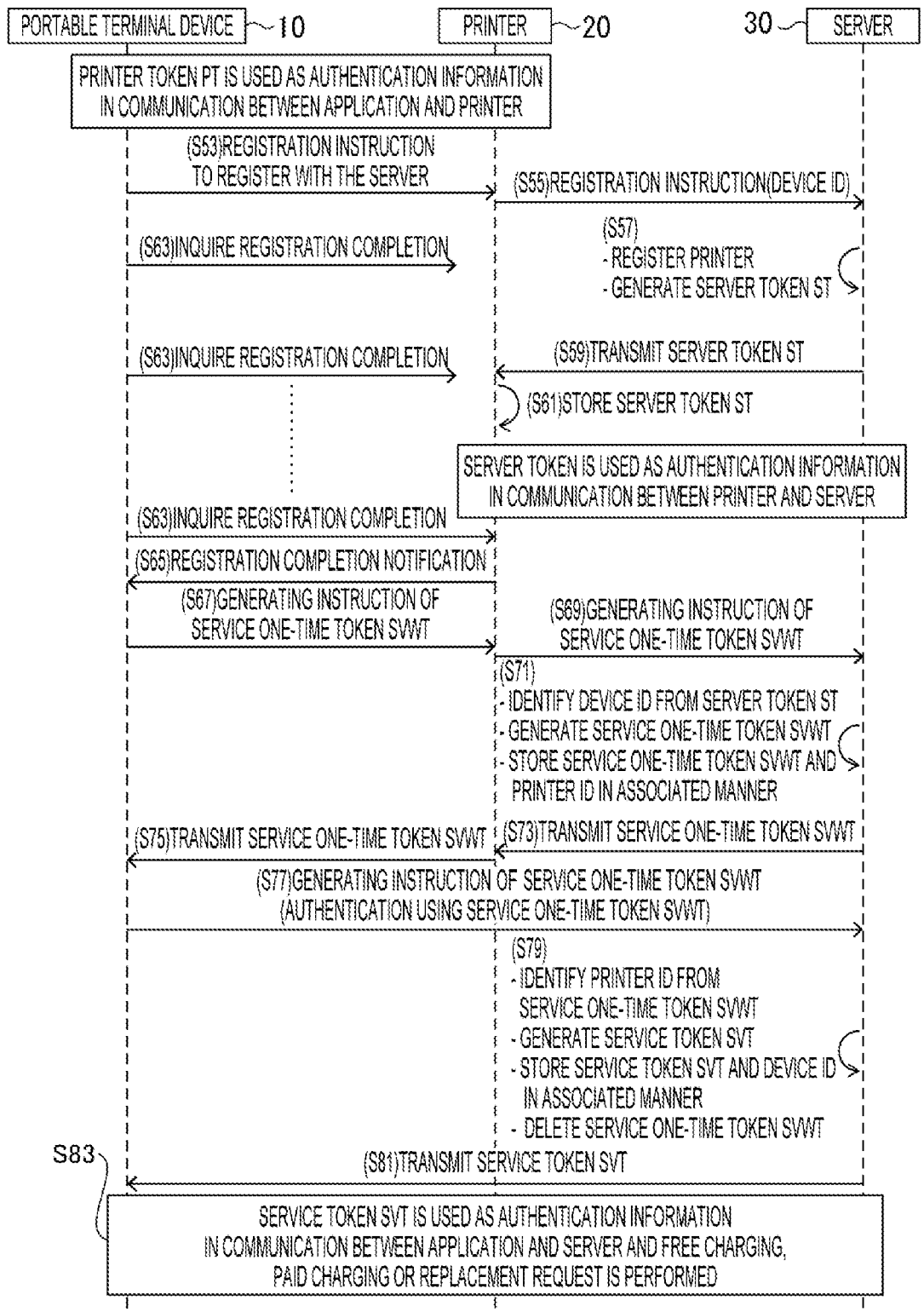
FIG. 5 is a sequence diagram in a case where an initial setting process is performed.
Figure 6:
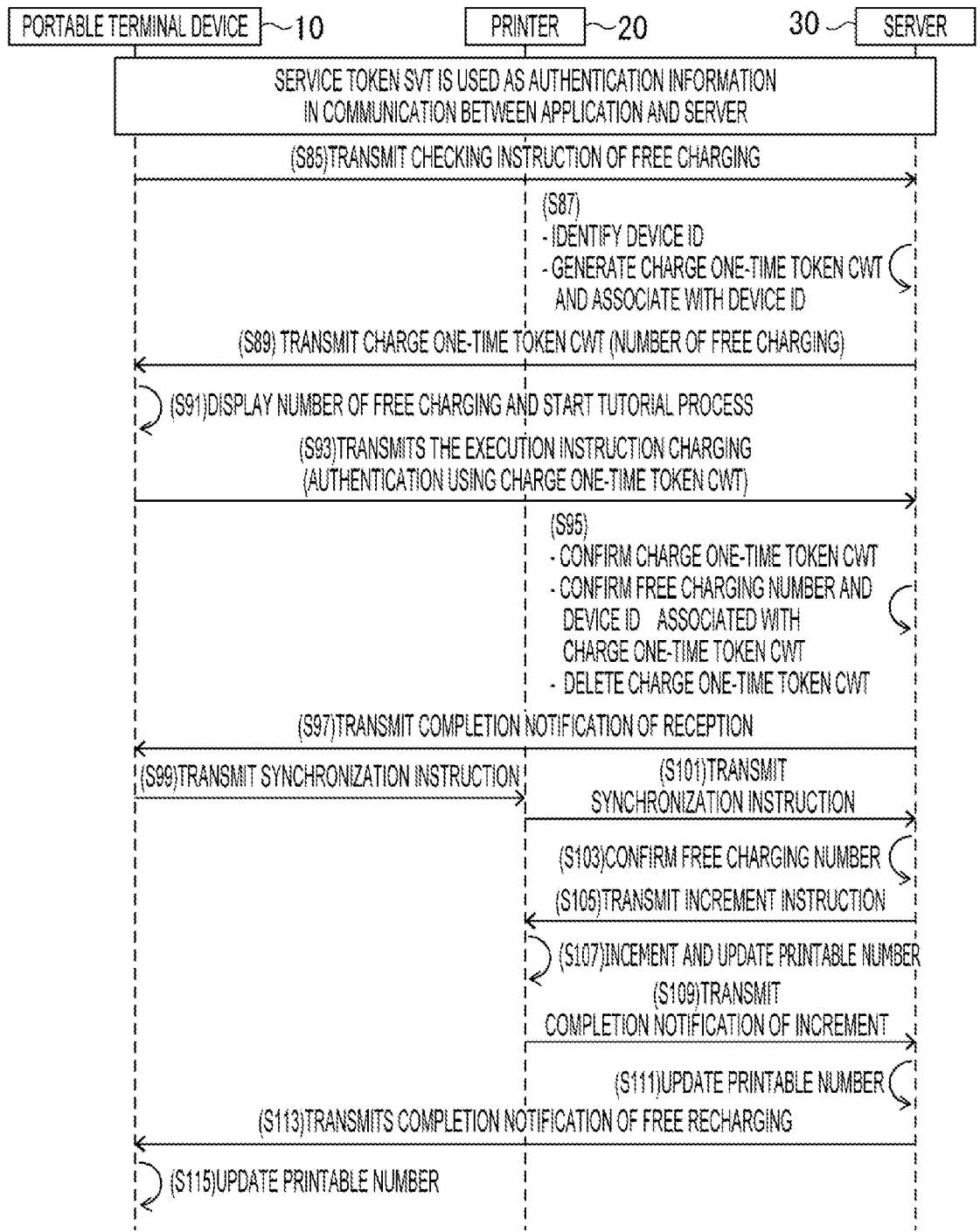
FIG. 6 is a sequence diagram in a case where a free charge process is performed.
Figure 8:
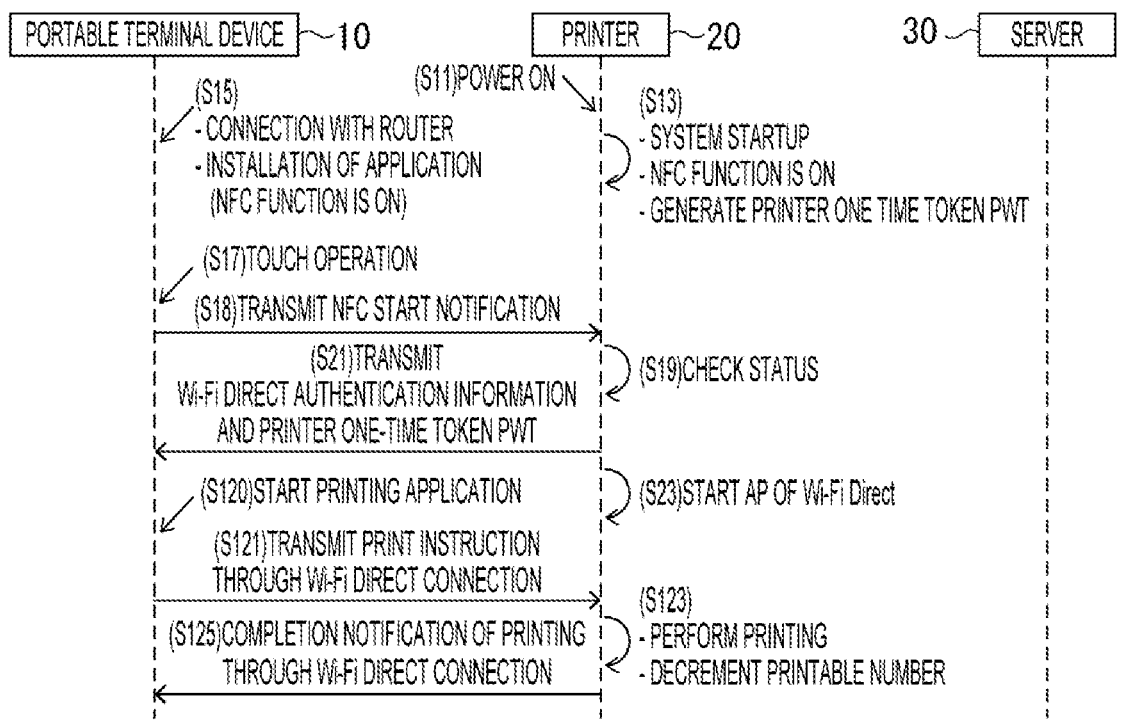
FIG. 8 is a sequence diagram in a case where an printing process is performed.

Alternatively, when the printer 20 determines that the communication setting of the printer 20 itself has not been made (S19), the printer 20 may transmits an instruction requesting from the connection information to the portable terminal device 10. In this case, if the printing process via the WFD communication can be performed in response to the touch operation as shown in FIG. 8 (described later), the portable terminal device 10 may execute S27 (i.e., transmission of the connection information) if the registration processes and the like shown in FIGS. 4-6 are executed, while transmit the print instruction via the WFD communication without responding to the request from the printer 20 if the printing process shown in FIG. 8 is executed (see S121 of FIG. 8).

It is noted that the information transmitted from the printer 20 to the portable terminal device 10 in S21 may be determined based on the information other than the above-described communication settings or the ink remaining amount. For example, when the network to which the printer 20 of which communication settings have been completed is to be changed, the user performs a particular operation input to the user IF 27 to cause the printer 20 to request the portable terminal device 10 for the connection information in response to the touch operation. In this way, the communication setting (e.g., the network) having been set to the printer 20 can be changed in accordance with the SSID and the like which is transmitted from the portable terminal device 10 in response to the touch operation.

When the printer 20 is accessed by the portable terminal device 10 via the WFD communication and obtains the connection information of the router (S27), the printer 20 terminates the WFD application (S29). In this way, the WFD communication between the portable terminal device 10 and the printer 20 is disconnected. The printer 20 connects with the router 2 via the Wi-Fi (registered trademark) wireless communication using the connection information (i.e., the SSID and the encryption key) obtained, in S27, from the portable terminal device 10 (S29). Then, the portable terminal device 10 and the printer 20 become mutually communicable via the router 2. Further, the printer 20 becomes communicable with the server 30 via the router 2.

Next, the portable terminal device 10 transmits an instruction to generate the printer token PT to the printer 20 under control of the management application 18B, via the Wi-Fi (registered trademark) wireless communication (i.e., via the router 2) (S31). The portable terminal device 10 performs, in the communication with the printer 20 (S31), the authentication using the printer one-time token PWT obtained in S21. For example, the portable terminal device 10 transmits transmission, to the printer 20, data with adding the printer one-time token PWT thereto. When the printer one-time token PWT added to the transmission data and the printer one-time token PWT the printer 20 itself retains coincide with each other, the printer 20 determines that the authentication is successful. Then, the printer 20 can identifies the portable terminal device 10 which is the current communication destination, and the management application 18B.

When obtaining the generating instruction in S31, the printer 20 generate the printer token PT (S33). The printer token PT is a token of which security is made higher by increasing the number of characters than the printer one-time token PWT, and the information used for identify the portable terminal device 10. It is noted that the number of characters of the printer token PT may be the same as or less than that of the printer one-time token PWT. The identification information of the portable terminal device 10 which is a transmission source of the generation instruction at S31, that is, the identification information of the portable terminal device 10 identified by the printer one-time token PWT and the generated printer token PT are stored in the printer storage 26GB in an associated manner. The printer 20 is configured to identify/authenticate the portable terminal device 10 which is the communication destination based on the above-described associated information in the subsequent processes. The identification information of the portable terminal device 10 is information used to identify a device (e.g., the ID of the management application 18B, the MAC address of the external communication IF 16).

Since the status of the printer 20 transits from a status to use the printer one-time token PWT to a status to use the printer token PT as the token information between the printer 20 and the portable terminal device 10, the printer 20 generates the printer one-time token PWT again and update the same (S33). In this way, the printer 20 is in a status of not receiving the control instruction using the old printer one-time token PWT. Further, when receiving an access from the portable terminal device 10 via the NFC communication, the printer 20 performs the communication using the updated printer one-time token PWT.

The printer 20 transmits the printer toke PT generated in S33 to the portable terminal device 10 (S35). The portable terminal device 10 and the printer 20 are configured to perform the authentication using the printer token PT in the communication via the router 2, and various processes. For example, the portable terminal device 10 and the printer 20 are configured to perform an initial setting process (S37 of FIG. 5) with respect to the printer 20. That is, the portable terminal device 10 and the printer 20 perform, based on the touch operations of the NFC communication, the startup of the management application 18B, the registration of the printer 20, and further the free charging (described later).

When a particular process using the printer token PT (e.g., an initial setting process) has been completed, the portable terminal device 10 transmits a deletion instruction to delete the printer token PT to the printer 20 (S39). Then, in response to the deletion instruction received from the portable terminal device 10, the printer 20 deletes the printer token PT (S41). In this way, the printer 20 becomes in a state where the printer 20 does not receive a control instruction using the printer token PT which has been received.

The printer 20 may be configured such that, the printer 20 does not delete the printer token PT based on the instruction received from the portable terminal device 10, but automatically delete the printer token PT when the printer 20 has not received the communication using the printer token PT, for example, for a certain period of time. Further, the printer 20 may determine the portable terminal device 10 which is the transmission source at S39 based on the information associated in S33 (i.e., the ID of the management application 18B and the MAC address of the external communication IF 22) to determine whether the portable terminal device 10 which is the transmitting source of the deletion instruction and the portable terminal device 10 which has generated the printer token PT coincide with each other. Processes in S43 onward will be described later.

It is noted that the processing contents of the wireless control process shown in FIG. 4 is an example. In the embodiment, the portable terminal device 10 connects the printer 20 to the router 2 via the NFC and Wi-Fi Direct (registered trademark). However, the communication standard is not necessarily limited to the above. When, for example, a bi-directional communication via the NFC is available, and the SSID and the like can be set to the printer 20, the portable terminal device 10 may be configured to perform an operation to connect the printer 20 to the router 2 only via the NFC communication. Further, the portable terminal device 10 may be configure to obtain the printer one-time token PWT from the printer, to obtain the WFD authentication information, transmit the connection information such as the SSID of the router.

Initial Setting Process

Next, referring to FIG. 5, an initial setting process which is performed in S37 in FIG. 4 will be described. As mentioned above, when it is determined that the printer 20 is unregistered in S19 and S21 of FIG. 4, the printer 20 transmits a registration instruction to register with the server 30 to the management application 18B of the portable terminal device 10. In response to this instruction, the management application 18B of the portable terminal device 10 performs the registration process of the printer automatically. It is noted that the printer 20 may transmit, in S21, only the startup instruction of the management application 18B. The management application 18B asks the user whether or not to execute the registration process of the printer 20 after the startup in S25. Then, when receiving the execution instruction, the management application 18B executed S27 onward. It is noted that the printer 20 may transmit only the startup instruction of the management application 18B in S21. After started up in S25, the management application 18B asks the user whether the registration process of the printer 20 is to be performed. When receiving the execution instruction, the management application 18B performs the process of S27 onward. Thereafter, the management application 18B executes from S27 to the process shown in FIGS. 5 and 6, and may execute the registration process, and the free charging process. Further, the printer 20 may transmit, in accordance with the result of determination in S19, an instruction to charge, in S21, to the portable terminal device 10 when, for example, the permitted number of sheets is equal to or less than a particular threshold value.

As shown in FIG. 5, in the communication between the portable terminal device 10 (i.e., the management application 18B) and the printer 20, the printer token generated and transmitted in S33 and S35 of FIG. 4 is used as the authentication information. When the portable terminal device 10 (i.e., the management application 18B) obtains the printer token PT in S35 of FIG. 4, the portable terminal device 10 transmits the registration instruction to register with the server 30 to the printer 20 (S53). Obtaining the registration instruction of S53, the printer 20 transmits the registration instruction to the server (S55). A method of according to which the printer 20 obtains the access information of the server 30 is not particularly limited but, for example, the access information (e.g., the URL) of the server 30 may be preset in the printer storage 26B. Alternatively, the printer 20 may be configured to obtain the access information of the server 30 from the portable terminal device 10.

The printer 20 is configured to transmit, in S55, the device ID ("dv1" in this example) of the printer management table PTB, the permitted number of sheets for printing, and the ink remaining amount to the server 30. When transmitted from the vender, the permitted number of sheets for printing indicated by the printer token PT is, for example, set to zero. The ink remaining amount may be substantially full. When obtaining the registration instruction from the printer 20 (S55), the server 30 registers the obtained information such as the device ID with the server management table STB (S57). In this way, the information regarding the printer 20 transmitted from the vender can be registered with the server 30.

The server 30 generates the server token ST in S57. Then, the server 30 stores the server token ST as generated and the device ID of the printer 20 which has obtained the instruction in S55 in the server storage 32B in an associated manner. It is noted that the server 30 may be configured to manage the server token ST with use of the server management table STB. The server 30 transmits the generate server token ST to the printer 20 (S59). The printer 20 stores the server token ST obtained from the server 30 in the printer storage 26B (S61). In the subsequent communication, the server 30 and the printer 20 performs the authentication using the server token ST described above.

On the other hand, the portable terminal device 10 performs polling (S63) to periodically inquire the printer 20 whether, for example, registration with the server 30 has completed after transmitting the registration instruction in S53. When obtaining the server token ST in S61, the printer 20 transmits (S65) a registration completion notification notifying of the completion of registration in response to the inquiry, in S63, from the portable terminal device 10. It is noted that the portable terminal device 10 may pause until the registration completion notification is received from the printer 20 without performing the polling.

When obtaining the registration completion notification from the printer 20, the portable terminal device 10 transmits a generation instruction of a service one-time token SVWT to the printer 20 in order to obtain the service one-time token SVWT from the server 30 via the printer 20 (S67). When obtaining the generation instruction from the portable terminal device 10, the printer 20 transmits the generation instruction of the service one-time token SVWT to the server 30 (S69).

When obtaining the generation instruction transmitted in S69, the server 30 identifies (S71) the device ID of the printer 20, which is the transmission source of the generation instruction, based on the server token ST used in the communication of S69 and the device ID which was associated with the server token ST in S57. Further, the server 30 generates the service one-time token SVWT, and the generated service one-time token SVWT and the identified device ID in the server storage 32B in an associated manner. In this way, it becomes possible to associate the particular printer 20 (i.e., the device ID) with the service one-time token SVWT. The server 30 transmits the service one-time token SVWT generated in S71 to the portable terminal device 10 via the printer 20 (S73 and S75).

When obtaining the service one-time token SVWT from the printer 20, the portable terminal device 10 transmits the generation instruction of the service token SVT directly to the server 30 without going through the printer 20 (S77). The portable terminal device 10 performs the authentication using the service one-time token SVWT in the communication performed in S77.

Obtaining the generation instruction transmitted in S77, as in S71, the server 30 identifies the device ID (S79) based on the service one-time token SVWT used in the communication at S77 and the device ID identified in S71. Further, the server 30 generate the service token SVT and stores the generated service token SVT and the identified device ID in the server storage 32B in an associated manner. In this way, a particular printer 20 (i.e., the device ID) and the communication destination (i.e., the portable terminal device 10) can be associated with each other via the service token SVT. It is noted that, in S79, the server 30 may associate the service token SVT with the identification information (e.g., the terminal ID or the ID of the management application 18B) of the portable terminal device 10. The server 30 generates the service token SVT, and shifts its operation from the authentication using the service one-time token SVWT to the authentication using the service token SVT, the server 30 deletes the service one-time token SVWT (S79). Then, the server 30 transmits the service token SVT generated in S79 to the portable terminal device 10 (S81).

In this way, the server 30 can determine which printer 20 (i.e., the device ID) is subjected to the communication (i.e., the control instruction and the like) by using the service token ST for authentication in the communication with the portable terminal device 10. The portable terminal device 10 and the server 30 perform various processes using the service token SVT (S83). It is note that the various processes include, for example, the free charging process for charging the permitted number of sheets for printing in accordance with the registration with the server 30, a paid charging process for charging the permitted number of sheets according to the charge (billing), and the replacement request for requesting the replacement of the printer 20.

Free Charge Process herein after, as an example of a process using the service token SVT, a free charge process will be explained with reference to FIG. 6. It is noted that the printing system 1 of the present disclosures is configured to collect a fee in accordance with the execution of charging and assign the number of printable sheets to the printer 20. The user, for example, to increase the number of printable sheets, registers a payment method for the fee, such as a credit card, and performs a charge operation to select the number of printable sheets to be charged (hereinafter referred to as the number of chargeable pages) in the management application 18B.

Since the user has to register the payment method for this charge operation, there is a possibility that the user will hesitate to charge. In contrast, the printing system 1 according to the present embodiment executes a tutorial process in which the management application 18B teaches the user the charging operation with charging a particular permitted number of sheets for free (hereinafter, referred to as a "free charge") for the printer 20 which has been registered with the server 30. For example, after obtaining the service token SVT transmitted in S81 of FIG. 5, the management application 18B transmits a checking instruction to check whether the free charging is to be executed to the server (S85). The server 30 perform the authentication using the authentication using the service token SVT in the communication with the portable terminal device 10 in S85. When, for example, the service token SVT transmitted from the portable terminal device 10 is included in the service token SVT generated by the server 30 itself, the server 30 executes a control based on the instruction (e.g., a checking instruction) transmitted from the portable terminal device 10.

When obtaining the checking instruction received from the portable terminal device 10 transmitted in S85, the server identifies (S87) the device ID (i.e., "dv1" at this time) which is associated with the service token STV in S79 of FIG. 5 based on the service token SVT used for the authentication in S83. The server 30 determines whether the free charging has been performed for the printer 20 corresponding to the identified device ID. For example, the server 30 may be configured to add execution information indicating whether the free charging has been performed in the server management table STB in association with the identified device ID, and update the execution information in response to execution of the free charging, thereby whether the free charging has been performed being checked. When the free charging has not been performed, the server 30 generates a charge one-time token CWT (S87). The server 30 associates the generated charge one-time token CWT with the device ID corresponding to the printer 20 for which the free charge has not been performed. Further, the server 30 associates a value of the number of sheets added by the free charging (e.g., 2000 sheets) with the charge one-time token CWT. It is noted that, when the free charging has already been performed by another portable terminal device 10 (e.g., the management application 18B), the server 30 associates a value of "zero" as the number of sheets added by the free charging, and they execute the tutorial process in S89 onward. In this way, although the permitted number of sheets does not increase, the tutorial process teaching the charging operation can be executed.

The server 30 transmits the charge one-time token CWT generated in S87 and the number of sheets added by the free charge associated therewith to the portable terminal device 10 (S89). When obtaining the charge one-time token CWT and the like, the portable terminal device 10 displays, under control of the management application 18B, the number of sheets added by the free charging on the touchscreen panel 14 (S91). Further, the portable terminal device 10 starts the tutorial process of the charging operation with displaying the number of sheets added by the free charging, while display an operation flow of the paid charging operation. The portable terminal device 10 is configured to receive the charging operation to charge the free charging with, for example, simulating operations to performed in the actual charging operation.

When receiving an operation to perform charging in the tutorial process, the portable terminal device 10 transmits the execution instruction of charging to the server 30 with performing the authentication using the charge one-time token CWT (S93). The server 30 performs the authentication (S95) by checking whether the charge one-time token CWT obtained from the portable terminal device 10 coincides with the charge one-time token CWT generated in S87. When the authentication is successful, the server 30 identifies the number of sheets for free charging (e.g., 2000 sheets or zero sheets) and the device ID which are associated with each other in S87. The server 30 activates the free charging for the printer 20 corresponding to the identified device ID. Concretely, when the server 30 obtains an instruction to synchronize the permitted number of sheets for printing for the printer 20 corresponding the identified device ID, the server 30 makes a setting for the printer 20 so that the number of sheets for the free charging is added to the permitted number of sheets. In S95, the server 30 deletes the charge one-time token CWT. In this way, by not executing the authentication regarding the charge one-time token CWT once used for authentication, it becomes possible to suppress the free charging of adding 2000 sheets to the permitted number of sheets for printing from being performed a plurality of times. Then, the server 30 transmits a completion notification indicating that the reception of the free charging has completed to the portable terminal device 10 (S97).

When obtaining the completion notification, the portable terminal device 10 transmits a synchronization instruction to start synchronization to the printer 20 (S99). The transmission destination of the synchronization instruction is the printer 20 which is selected by the operation in the tutorial process, and is the printer 20 corresponding to the device ID (i.e., "dv1" in this example) performing the initial setting process in FIG. 5. When obtaining the synchronization instruction transmitted in S99, the printer 20 transmits the synchronization instruction to the server 30 (S101). The printer 20 performs the authentication with the server 30 using the server token ST stored in S61 of FIG. 5, and transmits the synchronization instruction (S101).

The server 30 identifies the device ID (S103) which is associated with the service token SVT in S79 of based on the server token ST used in the communication of the synchronous instruction in S101. For the device ID identified in S103, the server 30 performs the free charging if there are the number sheets increased by the free charging which was activated in S95. Then, the server 30 transmits an addition instruction to add the number of sheets to be added by the free charging (S105). The printer 20 add the number of sheets to be added by the free charging to the permitted number in the printer token PT of the printer 20 itself (S107), and notifies the server 30 of the permitted number of sheets and the completion notification indicating the addition has completed (S109).

The server 30 overwrites the permitted number of sheets in the server token ST (the permitted number of sheets for the device ID "dv1") with the updated permitted number of sheets obtained from the printer 20 (S111). The server 30 transmits the completion notification indicating that the free recharging has been completed and the permitted number of sheets after the addition to the portable terminal device 10 (S113). The portable terminal device 10 updates the permitted number of sheets 18D with the obtained permitted number of sheets and displays the update permitted number on the tutorial screen (S115). The portable terminal device 10 displays a screen in which the permitted number of sheets is increased in the same way as in the actual charging operation, and then terminates the tutorial process. As a result, the free charging process can be executed as a process using the service token SVT set in the initial setting process of FIG. 5 (S83).

In the above example of FIG. 6, the free charging checking instruction is transmitted to the server 30 in S85 as "second control information related to the communication device" according to aspects of the present disclosures. However, the second control information according to aspects of the present disclosures is not necessarily limited to the above. That is, a paid charge instruction, which requires payment of a fee, may be adopted as the second control information, and a charge may be instructed from the portable terminal device 10 to the server 30. Alternatively, the replacement request instruction of the printer 20 may be adopted as the second control information, and the replacement request may be performed from the portable terminal device 10 to the server 30. In such a paid charging process and a replacement request process, as in the free recharging process described above, the service token SVT or the charge one-time token CWT can be used to identify the communication destination and execute the process.

It is preferable that the service token SVT generated by the server 30 has an expiration date from the viewpoint of suppressing unauthorized use of the token such as spoofing. For this reason, when the communication using the service token SVT has not been performed for a certain period of time, the service token SVT may be deleted. In this case, the service token SVT generated in the initial setting process of FIG. 5 as described above is to be used to perform the free charging immediately in S83, the service token SVT can be used. However, if the execution of the free charging process, the paid charging process, or the replacement request process takes only a certain amount of time after the initial setting process, the service token SVT may expire. In such a case, it becomes necessary that the portable terminal device 10 transmits an instruction to generate the service one-time token SVWT to the server 30 again, as shown in S67 onward of FIG. 5, and obtains the service one-time token SVWT via the printer 20.

Therefore, the printer 20 may be configured to periodically obtain the service one-time token (SVWT) from the server 30 even without instructions from the portable terminal device 10. For example, as shown in S43 of FIG. 4, the printer 20 may delete the printer token PT. Thereafter, the printer 20 may periodically execute an obtaining process of obtaining the service one-time token SVWT (S43) from the server 30, and store the obtained service one-time token SVWT in the server storage 32B (S45). In this way, it becomes possible to store the effective service one-time token SVWT in the server storage 32B at all times.

When obtaining the generation instruction of the service one-time token SVWT from the portable terminal device 10, the printer 20 transmits the service one-time token SVWT which has already been obtained (i.e., stored) to the portable terminal device 10 (S49). Then, as in S77 of FIG. 5, with use of the service one-time token SVWT obtained from the printer 20, the portable terminal device 10 can obtain the service token SVT from the server 30 and perform processes using the service token SVT (S51). In this way, a delay time caused by obtaining the service one-time token SVWT by the printer 20 can be reduced.

Touch Operation After Completing Communication Setting of Printer 20

Figure 7:
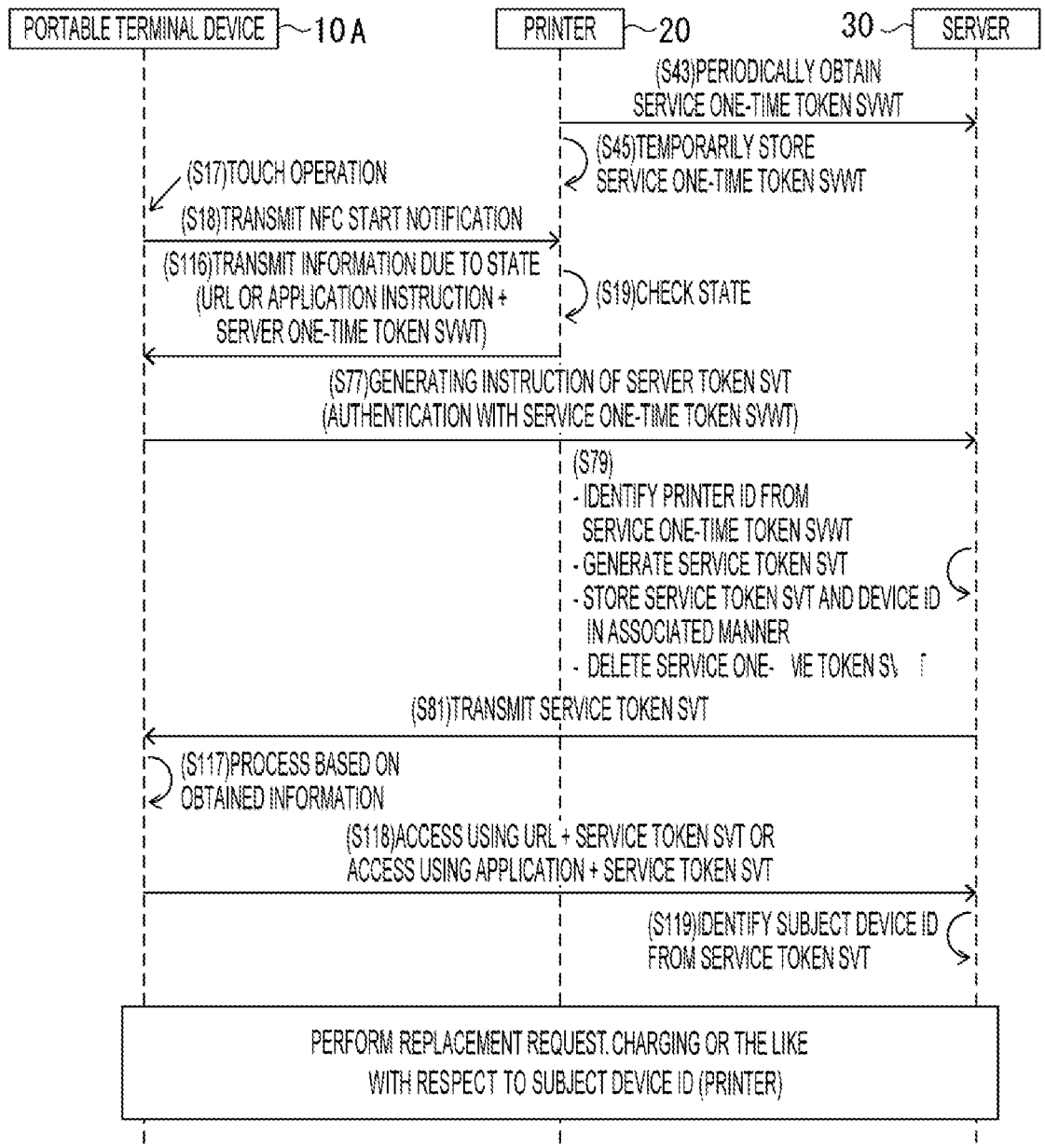
FIG. 7 is a sequence diagram in a case where a touch operation is performed after communication settings of the printer have been completed.

Referring to the process shown in FIG. 4, a case where the touch operation is performed in a state where the communication setting of the printer 20 has not be done and the printer 20 has not registered with the server 30. In contrast, a case where the touch operation is performed in a state where the communication setting of the printer 20 and the registration of the printer 20 with the server 30 have been completed will be described. FIG. 7 shows processes when the touch operation is performed after the communication setting of the printer 20 has been completed. It is noted that, in the following description, the same reference numbers/ symbols are assigned to processes the same as those in FIG. 4-6 and description thereof are omitted where appropriate.

The printer 20 periodically executes S43 and S45 to update the service one-time token SVWT even after the processes in FIGS. 4-6 have finished and the communication with the portable terminal device 10 in which the touch operation was performed has been disconnected. Thereafter, the touch operation is performed (S17, S18) in another portable terminal device 10A different from the portable terminal device 10. The portable terminal device 10 is, for example, a device of the system administrator who performs the communication settings, registration and the free charging of the printer 20. In contrast, the portable terminal device 10A is, for example, a terminal of a user who performs printing with use of the printer 20. It is noted that the portable terminal device 10 and the portable terminal device 10A may be the same devices and may be operated by the same user.

The printer 20 checks the status of the printer 20 itself in response to the touch operation (S17, S18) of the portable terminal device 10 (S19). The printer 20 may determine, for example, that the printer 20 itself is in a status where registration with the server 30 has been completed. The printer 20 may determine, for example, that the communication setting of the printer 20 itself has been completed as the service one-time token SVWT has been obtained from the server 30.

Since the registration and the communication setting of the printer 20 have been completed, the printer 20 checks the ink remaining amount and the permitted number of sheets for printing of the printer 20 itself (S19) and transmits information corresponding to the status of the printer 20. For example, the printer determines whether the ink remaining amount is equal to or less than a particular threshold value, that is, whether the printer 20 is to be replaced. When the ink remaining amount is equal to or less than the particular threshold value, the printer 20 transmits a URL of a website of the server 30 for requesting replacement of the printer 20, or a replacement request designating the application ID of the management application via the NFC communication (S116). Then, when the portable terminal device 10A obtains, for example, the URL from the printer 20, the portable terminal device 10A starts browser software to access the website indicated by the obtained URL, and displays a webpage for the replacement request on the touchscreen panel 14 (S117, S118). When the portable terminal device 10A receives, for example, the application ID, the portable terminal device 10A starts the management application 18B to display a screen for the replacement request (S117, S118).

When the registration and communication setting have been completed and the ink remaining amount is larger than the particular threshold value (i.e., unnecessary to replace), the printer 20 checks whether the permitted number of sheets for printing is equal to or less than a particular threshold number, that is, whether or not charging is necessary (S19). When the permitted number of sheets is equal to or less than the particular threshold number, the printer 20 transmits a URL of a website of the server 30 for charging, or a charging instruction designating the application ID of the management application 18B via the NFC communication (S116). In this way, when the URL has been obtained, the portable terminal device 10A starts the browser software and access the obtained URL and display w webpage for charging on the touchscreen panel 14 (S117, S118). When obtaining the application ID, the portable terminal device 10A starts the management application 18B and displays a screen for charging (S117, S118).

The printer 20 may transmit, in S116, the service one-time token SVWT obtained in advance, via the NFC communication between the short-range communication IF 21 and the short-range communication IF 13, to the portable terminal device 10A. When obtaining the service one-time token SVWT, similar to the processes in FIG. 5, the portable terminal device 10A obtains the service token SVT from the server 30 (S77, S79, S81).

When the portable terminal device 10A obtains, in S116, the URL of a webpage for performing the replacement request, the portable terminal device 10A starts the browser software (S117), adds the service token STV obtained in S81 to the URL, and accesses the URL to which the service token SVT has been added (S118). By notifying the server 30 of the service token SVT (which is also referred to as query parameter), it becomes possible to display the replacement request page of the device ID (i.e., the printer 20) identified by the server 30 based on the service token SVT (processes in S119 onward). Similarly, when the replacement request designating the application ID is received in S116, the portable terminal device 10A starts the management application 18B (S117) and notifies the service token SVT when accessing the server 30 with the management application 18B (S118). In this way, the portable terminal device 10A can display the replacement request screen corresponding to the printer 20 identified by the server 30 based on the service token SVT under control of the management application 18B.

When receiving the charging instruction, the portable terminal device 10A can perform processing as in the case where the replacement request is received described above. Although details are omitted, when the portable terminal device 10A obtains the URL of the webpage for charging in S116, the portable terminal device 10A can display the charging page of the server 30 by accessing the obtained URL with adding the service token SVT (S118).

In the embodiment described above, the printing system 1 is an example of a communication system. The portable terminal devices 10 and 10A are examples of a terminal device. The printer 20 is an example of a communication device and a printing device. The terminal controller 11 is an example of a terminal device-side controller. The short-range communication IF 13 is an example of a terminal device-side short-range communication interface. The NFC is an example of a short-range wireless communication. The Wi-Fi Direct (registered trademark) is an example of a first wireless communication. The external communication IF 16 is an example of a terminal device-side wireless communication interface. The short-range communication IF 21 is an example of a communication device-side short-range wireless communication interface. The external communication IF 22 is an example of the communication device-side wireless communication interface. The printer controller 26 is an example of a communication device-side controller. The Wi-Fi Direct authentication information is an example of first connection information. The printer one-time token PWT is an example of first identification information. The connection information (e.g., the SSID and the encryption key) of the router 2 is an example of first control information and second connection information. The Wi-Fi (registered trademark) is an example of a second wireless communication. The router 2 is an example of an access point. The printer token PT is an example of second identification information. The service token SVT and service one-time token SVWT are examples of server-side identification information.

S18 is an example of a communication starting process, and a communication starting step. S21 is an example of a first identification information transmitting process, a first identification information transmitting step, and a first identification information obtaining process. S27 is an example of a first control information transmitting process, the first control information transmitting step, and the first control information obtaining process. S29 is an example of a control process and a control step. S27 is an example of a first connection process. S29 is an example of a second connection process. S31 is an example of a first setting instruction transmitting process and an authentication process. S33 and S35 are examples of a second identification information transmitting process. S53 is an example of a registration instruction process. S55 is an example of a registration process. S67 and S77 are examples of a server-side identification information obtaining process. S85 is an example of a second control information transmitting process. S79 is an example of an association process. S43 is an example of a second server-side identification information obtaining process. S49 is an example of a server-side identification information transmitting process. S116 is an example of a server-side identification information transfer process.

Effects

According to the embodiment described above, the following effects can be achieved.

(1) The portable terminal device 10 according to the above-described embodiment is configured to transmit the communication start notification to perform the NFC communication between the short-range communication IF 13 and the short-range communication IF 21 (S18). In response to the process in S18, the printer transmits the WDF authentication information used for the WFD communication and the printer one-time token PWT from the short-range communication IF 21 to the short-range communication IF 13 via the NFC communication (S21). With use of the WFD authentication information obtained in S21, the portable terminal device 10 transmits the connection information (i.e., the SSID and the encryption key) of the router 2 via the WEF communication from the external communication IF 16 to the external communication IF 22 (S27). Based on the connection information of the router 2 obtained in S17, the printer 20 performs the connection setting to the router 2 (S29).

According to the above configuration, the printer 20 can make the setting of the wireless communication to the printer 20 itself by obtaining the connection information from the portable terminal device 10 communicable via the short-range wireless communication, that is the portable terminal device 10 (i.e., the user) located close to the printer 20. Accordingly, it becomes possible to make the user close to the printer 20, that is, the user who is likely to be the authorized user perform the control processes such as change of settings, instructions of operations, and the like of the printer 20. Further, authentication of the user close to the printer 20 can be performed without requesting, for example, the user to perform a physical authentication operation, such as the touch operation to the user IF 27 of the printer 20. Therefore, in a case where control instructions to the printer 20 are performed from a particular portable terminal device 10, the workload of the user, such as the physical authentication, can be reduced.

(2) In the above-described embodiment, a communication compliant to the NFC (Near Field Communication) standard is used as the short-distance wireless communication. Therefore, only users who are within a short distance from the printer 20, with which NFC communication is possible, can be allowed to give control instructions to the printer 20.

(3) In the above embodiment, as a first wireless communication according to aspects of the present disclosures, the WFD communication is adopted in which the portable terminal device 10 and the printer 20 communicate directly without going through other devices (such as the router 2). The portable terminal device 10 is connected to the access point (i.e., the router 2) via Wi-Fi (registered trademark) and has the SSID and the encryption key used to connect to the router 2. In S27, the portable terminal device 10 transmits the SSID of the router 2. In S29, based on the connection information obtained from the portable terminal device 10, the printer 20 performs the setting to connect to the router 2 via Wi-Fi (registered trademark). According to this configuration, the printer 20 obtains the connection information from the portable terminal device 10, which is in the vicinity of the printer 20 and is capable of perform the NFC communication and connects to the router 2. This allows the printer 20 to acquire connection information from nearby portable terminal devices 10 that are capable of NFC communication and to connect to the router 2. Thus, the printer 20 can be connected to the network by receiving the connection information from the highly reliable portable terminal device 10.

The portable terminal device 10 transmits the generation instruction (which is an example of a first setting instruction) instructing generation of the printer token PT to the printer via Wi-Fi (registered trademark) by performing the authentication using the printer one-time token PWT (S31). In response to obtaining the generation instruction in S31, the printer 20 generates the printer token PT, which is different from the printer one-time token PWT and is for identifying the portable terminal device 10 (S33), and transmits the generated printer token PT to the portable terminal device 10 (S35). In this way, the portable terminal device 10 can transmit the control instruction to the printer using the printer token PT which is different from the printer one-time token PWT obtained via the NFC communication. Further, by changing the number of characters of the printer one-time token PWT and the number of characters of the printer token PT, the security level of the tokens used in the WFD communication and the communication compliant to Wi-Fi (registered trademark) standard can be changed.

It is noted that the printer 20 or the server 30 may not generate the token after receiving the generation instruction. For example, in S31 of FIG. 4, a setting instruction of the printer one-time token PWT (an example of a first setting instruction) is transmitted to the printer 20 (an example of a first setting instruction transmitting process). The printer 20 has a plurality of printer tokens PT which have been generated in advance, and selects one printer token PT to be used from among the generated printer tokens PT. The printer 20 stores, in the printer storage 26B, the identification information of the portable terminal device 10 which is, for example, the transmission source of the setting instruction transmitted in S31, that is, the portable terminal device 10 identified by the printer one-time token PWT and the selected printer token PT in an associated manner. Accordingly, the printer 20 may not generate the printer token PT as necessary, but select one from among the printer tokens PT having been generated in advance and associate the same with the portable terminal device 10 which is the communication destination.

(5) The portable terminal device 10 transmits, in S53, the registration instruction with the server 30 to the printer 20 via the Wi-Fi (registered trademark) using the printer token PT obtained in S35. Upon obtaining the registration instruction, the printer connects to the server 30 via Wi-Fi (registered trademark) and registers information of the printer 20 itself with the server (S55). According to the above-described configuration, it becomes possible to transmit the registration instruction to the printer 20 from the highly reliable portable terminal device 10 using the printer token PT to register the printer 20 with the server 30. Thus, registration of the printer 20 can be performed securely.

(6) The printer 20 updates the printer one-time token PWT at every particular time period in S13, and updates the printer one-time token PWT even when the printer token PT is generated. According to this configuration, by updating the printer one-time token PWT periodically or after each use, the security level for the control using the printer one-time token PWT can be increased. By shortening the effective period of the printer one-time token PWT, even if the number of characters in the printer one-time token PWT is shortened, the security level can be maintained by reducing the opportunity (i.e., time to attempt) for authentication by randomly generating unauthorized tokens such as randomly generated tokens or brute-force tokens. In other words, the number of characters in the printer one-time token PWT can be shortened.

(7) The server 30 is configured to generate the service token SVT. The portable terminal device 10 obtains the service one-time token SVWT (S67, S77) via the printer 20 using the printer token PT obtained from the printer in S33 and S35. The portable terminal device 10 transmits, using the service token SVT, the free charge checking instruction (an example of second control information) to the server in S85 of FIG. 6. Before transmitting the service token SVT to the portable terminal device 10 in S81, the server 30 identifies the printer 20, via which the generation instruction of the service one-time token SVWT was transmitted from the portable terminal device 10 to the server 30 in S67 based on the server token ST (S71), and associates the device ID of the identified printer 20 with the service token SVT (S79).

In response to obtaining the free charge checking instruction and performing the authentication in S85, the server 30 performs the free charging (S87 onward) for the printer 20 which is associated with the service token SVT used for communication. In this way, when the service token SVT is generated, the server 30 associates the generated service token SVT with the printer 20. Then, when the server 30 obtains the free charge checking instruction from the portable terminal device 10, the server 30 can determine which printer 20 is subjected to the free charge checking instruction based on the service token SVT used for the communication. That is, a target for the control information can be identified from the portable terminal device 10 using the service token SVT.

(8) In the above-described embodiment, the printer 20 configured to perform printing on the sheet using the ink (an example of colorant according to aspects of the present disclosures) is employed as a communication device according to aspects of the present disclosures. The printer 20 performs the printing operation within a range of the permitted number of sheets (an example of a print permission amount according to aspects of the present disclosures) for printing. The server 30 associates the device ID of the printer 20 with the permitted number of sheets for printing and store the same in the server management table STB. The portable terminal device 10 transmits the free charge checking instruction to the server 30. In this way, the portable terminal device 10 that instructs the free charging, the paid charging and replacement request to the server 30, and the printer 20 subjected to such instruction can be identified by the service token SVT and processes can be performed.

(9) After the printer 20 is connected to the server 30 via Wi-Fi (registered trademark), the printer 20 obtains the service one-time token SVWT corresponding to the service token SVT from the server 30 at every particular time period (S43). The server 30 transmits the service one-time token SVWT having been obtained in S43 to the portable terminal device (S49) when requested the same by the portable terminal device 10 (S47). In this way, the portable terminal device 10 can instruct the server 30 to generate the service token SVT using the service one-time token SVWT. Thus, a delay time that occurs when the printer 20 obtains the service one-time token SVWT can be shortened.

(10) When the printer 20 is communicable with the server 30 through the router 2 via Wi-Fi (registered trademark), the printer 20 obtains the service one-time token SVWT from the server 30. In accordance with the touch operation of the NFC communication (S18 of FIG. 7), the printer 20 transmits, to the portable terminal device 10A, the service one-time token SVWT obtained from the server 30 from the short-range communication IF 21 to the short-range communication IF 13 via the NFC communication (S116). According to this configuration, the printer 20 transmits the service one-time token SVWT obtained from the server 30 in advance to the portable terminal device 10A. As the portable terminal device 10A accesses the server 30 using the service token SVT obtained with use of the service one-time token SVWT, the server 30 can identify which printer 20 is the target of the access based on the service token SVT. Further, by performing the authentication using the service token SVT, when the portable terminal device 10A has accessed the replacement request page or the charge page of the server 30, the page of the printer 20 identified by the service token SVT can be displayed with omitting the authentication to the portable terminal device 10A.

(11) The portable terminal device 10 transmits the communication start notification for starting the NFC communication between the short-range communication IF 13 and the short-range communication IF 21 (S18). In accordance with the process in S18, the printer 20 transmits the WFD authentication information to be used for connection of the WFD communication and the printer one-time token PWT from the short-range communication IF 21 to the short-range communication IF 13 via the NFC communication (S21). The printer 20 establishes the connection of the WFD communication with the portable terminal device 10 based on the transmitted WFD authentication information (S27). Further, the printer 20 establishes the wireless communication according to the Wi-Fi (registered trademark) standard using the SSID of the router 2 or the encryption key (an example of first control information according to aspects of the present disclosures) transmitted from the portable terminal device 10 via the WFD communication (S29). In the wireless communication according to the Wi-Fi (registered trademark) standard in S31, the printer 20 performs the authentication using the printer one-time token PWT which was transmitted in S21 (an example of an authentication process according to aspects of the present disclosures). It is noted that the printer 20 may perform the authentication using the printer one-time token PWT in the WFD communication in S27. In this case, S27 is an example of the authentication process according to aspects of the present disclosures.

According to the above configuration, the printer 20 transmits the WFD authentication information for establishing the communication between the portable terminal device 10 and the printer 20 and the printer one-time token PWT for performing the authentication of the portable terminal device 10 with respect to the printer 20 to the portable terminal device 10. As the portable terminal device 10 performs the short-range wireless communication with the printer 20 which is close to portable terminal device 10 and capable of performing the short-range wireless communication, it becomes possible to connect the WFD communication and perform the authentication using the printer one-time token PWT, reduce the workload of the user in the authentication process, and provide the secure authentication. Further, the printer 20 can perform settings of the wireless communication to the printer 20 itself by obtaining the connection information such as the SSID from the portable terminal device 10 (i.e., the user) communicable via the short-range wireless communication, and relatively close to the printer 20.

(12) Upon performing the authentication process in S31, the printer 20 transmits the printer token PT to the portable terminal device 10 via the Wi-Fi (registered trademark) standard (S35). In this way, the portable terminal device 10 can instruct the control to the printer 20 using the printer token PT which is different from the printer one-time token PWT obtained via the NFC communication.

(13) The printer 20 transmits the application ID (an example of information used for execution of a registration process according to aspects of the present disclosures) of the management application 18B to the portable terminal device 10 in S21. In this way, the portable terminal device 10 can receive information used for registration to the server 30 in the NFC communication, perform the startup of the management application 18B, and execute the automatic registration of the printer 20. Therefore, the workload on the user in the registration process can be reduced.

Printing Process Using WFD Communication

In the example shown in FIG. 4, the portable terminal device 10 starts the management application 18B in S25, transmits the connection information (i.e., the SSID and the encryption key: an example of first control information) of the router 2 to the printer 20, thereby performing the setting of the wireless communication to connect the printer 20 to the router 2 as the control process according to aspects of the present disclosures. However, the first control information and the control process according to aspects of the present disclosures are not necessarily limited to the above examples which are related to the settings of the wireless communication. That is, as shown in FIG. 8, the first control information and the control process according to aspects of the present disclosures may be control information and a control process related to printing. It is noted that, in the following description, contents same as those shown in FIG. 4 will be assigned with the same reference numerals and description thereof will be omitted where appropriate. Further, in the example shown in FIG. 8, a particular permitted number of sheets have been charged when the printer 20 is shipped from the vender.

After the touch operation in S17 and S18, when obtaining the WFD authentication information and the printer one-time token PWT from the printer 20 (S21), the portable terminal device 10 starts the printing application 18C (S120). The startup of the printing application 18C may be performed in response to an instruction from the printer 20, or an instruction by the user. The user operates the printing application 18C to instruct the printer 20 to perform printing.

The portable terminal device 10 transmits the print instruction to the printer via the WFD communication based on the operation input to the printing application 18C (S121). In the communication at S121, the printer 20 performs the authentication of the portable terminal device 10 using, for example, the printer one-time token PWT. That is, the printer 20 determines whether the portable terminal device 10 that is the transmission source of the print instruction is the portable terminal device 10 used for the touch operation in S18.

It is noted that the printer 20 may not perform the authentication using the printer one-time token PWT. In such a case, the printer 20 may not transmit the printer one-time token PWT in S21. When the authentication is successful, the printer 20 performs printing based on the obtained print instruction with the print engine 25 (S123). After subtracting the number of printed sheets from the permitted number of sheets in the printer management table PTB (S123), the printer 20 notifies the portable terminal device 10 of completion of the printing via the WFD communication (S125). The printer notifies the portable terminal device 10 of the permitted number of sheets for printing after the subtraction above (S125).

In the process of FIG. 8, the print instruction of S121 is an example of the first control information according to aspects of the present disclosures. The printing process of S123 is an example of the control process.

In the process of FIG. 8 described above, the portable terminal device 10 transmits the print instruction as the first control information (S121). The printer 20 performs the printing based on the print instruction obtained from the portable terminal device 10 in S123. According to the above configuration, it becomes possible to allow only a user having a portable terminal device 10 capable of performing the NFC communication, that is, the user close to the printer 20 to perform printing based on the print instruction to print with the printer 20. Therefore, similar to the setting of the wireless communication of the Wi-Fi (registered trademark) of FIG. 4, execution of the printing is permitted only to the user who is highly likely the authorized user who is close to the printer 20. Further, a print instruction can be received from a user who is present near the printer 20 without requiring physical operation (authentication) of the user IF 27. Therefore, control instruction for the printer 20 can be received. Therefore, when control instructions for the printer 20 are to be executed from a particular portable terminal device 10, the workload of the user, such as physical authentication, can be reduced.

Modifications

Although the various examples have been described in detail above, they are only examples and do not necessarily limit aspects of the present disclosures. Rather, the above-described examples can be further modified in various ways without departing from aspects of the present disclosures. For example, in the above-described embodiment, as the terminal device, a smartphone is referred to. However, according to aspects of the present disclosures, the terminal device does not need to be limited to the smartphone, but a desktop PC, a note PC, a tablet PC, or the like can be used as the terminal device.

As the communication device according to aspects of the present disclosures, the inkjet type printer 20 is used, but printers of other types (e.g., a laser type, a thermal type, or the like) may be employed. The communication device according to aspects of the present disclosures may include various devices capable of performing the wireless communication, such as an MFP (multi-function peripheral) having a scanning function, a copier function, and a facsimile function, home-use or industrial sewing machines, and machine tools.

The printing system 1 executes only the printing process shown in FIG. 8, while does not need to execute the process of connecting the printer 20 in FIG. 4 to the router 2, or the process of registering the printer 20 in FIG. 5 to the server 30.

In S13, the printer 20 updates the printer one-time token PWT at every particular time period in the above-described embodiment, but the printer 20 does not need to update the same.

In addition, the printer 20 does not need to perform the process of obtaining the service one-time token SVWT at every particular time period in S43 and S45 of FIG. 4.

In the above-described embodiment, the permitted number of sheets is stored in the printer management table PTB, and the like. Then, the number of printable sheets is reduced at every execution of printing to determine whether printing can be performed. In contrast, the permitted number of sheets for printing may be managed with use of the number which is increased at every execution of printing. In this case, for example, a value obtained by subtracting a cumulative number of sheets printed, which is the cumulative number of sheets printed, from a cumulative number of sheets charged, which is the cumulative number of sheets charged, may be used as the permitted number of sheets for printing (i.e., permitted amount for printing).

The contents of each sequence diagram and flowchart above and the order of processes are only examples. For example, the printer 20 may be configured to perform only the notification process based on at least one status flag 26B4 among the status flags 26B4 which are set in S5 to S9. For example, the printer 20 may be configured to perform a process to guide only the charge page 91 based on the permitted number of sheets for printing.

The printer 20 notifies the URL of the charge page 91 or the replacement request page 105 to the portable terminal device 10 based on whether the status flag 26B3 is set to the value "02" or "03." It is noted that the same information may be notified to the portable terminal device 10. For example, the printer 20 may be configured to notify the URL of the top page 75 shown in FIG. 9 to the portable terminal device 10 in S107. In this way, the top page 75 with the printer 20 selected may be displayed on the portable terminal device 10, and the charging and replacement request can be received from the top page 75.

Further, as mentioned above, the process contents shown in FIG. 8 are of the comparative example. The confiscation may be modified such that the server 30 can display the charge pages 91 to 93, and the replacement request pages 105 and 106 in FIG. 9, but not the top page 75.

The printing system 1 according to the above-described embodiment is a system configured to record the device IDs and the permitted numbers of sheets for printing in the server management table STB in an associated manner to manage the permitted number for each printer 20. The configuration is not necessarily limited to the above. For example, the printing system 1 may be configured to associate the portable terminal device 10 with a user for management. For such a management, as information regarding user may include a user ID registered with the management application 18B, a user ID of the user who is using the portable terminal device 10.

The configuration of the printer 20 described above is an example. For example, the printer 20 may be configured without the external communication IF 22.

In the above-described embodiment, the printer 20 is configured to store the printer management table PTB in the printer storage 26B. However, the configuration does not need to be limited to the above configuration. The printer 20 may be provided with an interface configured to read a readable medium such as an IC card, a memory card and the like. Then, the printer 20 may be configured to read the information stored in the printer management table PTB such as the device ID, the permitted number of sheets for printing and the like from the IC card or the like attached to such an interface. That is, the printer 20 may be configured such that the printer management table PTB is managed by the IC card or the like.

Alternatively, when the printer 20 may be configured such that the information stored in the printer management table PTB (e.g., the permitted number of sheets for printing) may be stored in a memory other than the storage in which the printer program 26B1 is stored, and the printer 20 may be managed based on the information stored in such a memory. For example, when the printer 20 is an inkjet printer, the information stored in the printer management table PTB may be stored in a memory provided to the ink tank 23. Alternatively, when the printer is a laser printer, the information stored in the printer management table PTB may be stored in a memory provided to a toner cartridge, a photosensitive drum, or the like.

It is noted that the print permitting amount is not necessarily limited to the permitted number of sheets for printing. For example, the permitting amount may be defined by a consumption amount of the ink or the toner. The print permitting amount may be defined by an ink ejection amount (e.g., the ink necessary for permitted number of bits (pixels) of an image, or a permitted usage amount of the ink (e.g., the amount defined by a usable volume). Alternatively, the permitting amount may be defined by the number of rotations of a rotatable member which rotates in association with the printing operation (e.g., the photosensitive drum).

The configuration of the printing system 1 in the above embodiment is only an example. The printing system 1 may be configured without the server 30. Further, the printing system 1 may have a plurality of portable terminal devices 10, printers 20, and servers 30. Alternatively, the printing system 1 may have a plurality of portable terminal devices 10 configured to use a single printer 20. Further alternatively, the printing system 1 may have a single portable terminal device 10 which is configured to use a plurality of printers 20.

The printer 20 may be configured such that the user can refill the ink in each ink tank (e.g., replace ink cartridges of the ink tank). As another means for replenishing consumables such as ink, the ink tank 23 or ink cartridges of the ink tank 23 may be configured that the ink contained in a bottle is poured therein.

The terminal device-side controller and the communication device-side controller according to aspects of the present disclosures may not have the terminal storage 18 or the printer storage 26B.

What is claimed is:

1. A communication system, comprising:
a terminal device; and
a communication device,
wherein the terminal device includes:
a terminal device-side short-range wireless communication interface configured to perform a short-range wireless communication;
a terminal device-side wireless communication interface configured to perform a first wireless communication which is a wireless communication different from the short-range wireless communication; and
a terminal device-side controller,
wherein the communication device includes:
a communication device-side short-range wireless communication interface configured to perform the short-range wireless communication;
a communication device-side wireless communication interface configured to perform the first wireless communication, the first wireless communication is a wireless communication with which the terminal device and the communication device directly perform a communication without any other device configured to relay the communication; and
a communication device-side controller,
wherein the terminal device-side controller is configured to perform a communication starting process of executing the short-range wireless communication between the terminal device-side short-range wireless communication interface and the communication device-side short-range wireless communication interface, and the terminal device is configured to connect to an access point via a second wireless communication and wherein the terminal device contains second connection information used to connect to the access point,
wherein, in response to execution of the communication starting process, the communication device-side controller is configured to perform a first identification information transmitting process of transmitting first connection information and first identification information to the terminal device-side short-range wireless communication interface using the communication device-side short-range wireless communication interface via the short-range wireless communication, the first connection information being used for connection of the first wireless communication, the first identification information being used to identify the terminal device that has performed the communication starting process,
wherein the terminal device-side controller is configured to perform a first control information transmitting process of transmitting first control information from the terminal device-side wireless communication interface to the communication device-side wireless communication interface via the first wireless communication using the first connection information obtained from the communication device in the first identification information transmitting process, wherein the terminal device-side controller is configured to transmit the second connection information as the first control information in the first control information transmitting process,
wherein the communication device-side controller is configured to perform a control process of controlling of the communication device based on the first control information obtained from the terminal device in the first control information transmitting process and wherein the communication device-side controller is configured perform a setting to connect to the access point via the second wireless communication based on the first control information obtained from the terminal device,
wherein the terminal device-side controller is configured to perform a first setting instruction transmitting process of transmitting a first setting instruction to set second identification information to the communication device via the second wireless communication with performing an authentication using the first identification information,
wherein the communication device-side controller is configured to perform, in response to obtaining the first setting instruction, a second identification information transmitting process of transmitting identification information, which is different from the first identification information, to identify the terminal device as the second identification information, wherein the terminal device and the communication device are further configured to be connected to a server via the second wireless communication,
wherein the server is configured to set server-side identification information,
wherein the terminal device-side controller is configured to:
  obtain the server-side identification information via the communication device using the second identification information obtained from the communication device, where the second identification information is obtained from the communication device and is different from the first identification information; and
  transmit second control information related to the communication device using the server-side identification information,
wherein the server is configured to:
associate the communication device with the server-side identification information in response to transmitting of the server-side identification information to the terminal device; and
control, based on the second control information, the communication device associated with the server-side identification information used to transmit the second control information in response to obtaining of the second control information.

2. The communication system according to claim 1,
wherein the communication device is a printing device configured to perform printing on a sheet using a colorant, the printing device being allowed to perform printing within a print permitting amount,
wherein the server is configured to store the print permitting amount in association with information identifying the printing device, and
wherein the terminal device-side controller is configured to transmit, to the server, the control information increasing the print permitting amount.

3. The communication system according to claim 1,
wherein the communication device-side controller is configured:
obtain information related to the server-side identification information at every particular period after connecting to the server via the second wireless communication; and
transmit, when requested by the terminal device for information related to the server-side identification information, information related to the server-side identification information to the terminal device.

4. A communication device, comprising:
a communication device-side short-range wireless communication interface configured to perform a short-range wireless communication;
a communication device-side wireless communication interface configured to perform a first wireless communication different from the communication device-side short-range wireless communication interface, the first wireless communication is a wireless communication with which a terminal device and the communication device directly perform a communication without any other device configured to relay the communication; and
a communication device-side controller configured:
perform a communication starting process of executing the short-range wireless communication between the terminal device and the communication device-side short-range wireless communication interface;
in response to execution of the communication starting process, a first identification information transmitting process of transmitting first connection information and first identification information to a terminal device-side short-range wireless communication interface using the communication device-side short-range wireless communication interface via the short-range wireless communication, the first connection information being used for connection of the first wireless communication, the first identification information being used to identify the terminal device that has performed the communication starting process with the communication device;
a first control information obtaining process of obtaining first control information transmitted from the terminal device using the communication device-side wireless communication interface via the first wireless communication using the first connection information transmitted in the first identification information transmitting process, where the first control information includes second connection information which is used to connect with an access point, where the second connection information is obtained by the terminal device and where the terminal device has connected to the access point via a second wireless communication;
a control process of performing controlling based on the first control information obtained from the terminal device in the first control information obtaining process, the controlling including performing a setting to connect to the access point via the second wireless communication based on the first control information from the terminal device;
receiving a first setting instruction to set second identification information to the communication device via the second wireless communication with performing an authentication using the first identification information; and
perform in response to receiving the first setting instruction, a second identification information transmitting process of transmitting identification information, which is different from the first identification information, to identify the terminal device as the second identification information,
wherein the communication device is further configured to be connected to a server via the second wireless communication,
wherein the communication device-side controller is configured to receive second control information related to the communication device using server-side identification information, the second control information being received from the terminal device, the server-side identification information being obtained by the terminal device via the communication device, using the second identification information which is obtained from the communication device in the second identification information transmitting process, wherein the server-side identification information is set in the server, wherein the communication device is associated with the server-side identification information, and
wherein the communication device is controlled based on the second control information.

5. The communication device according to claim 4, wherein the short-range wireless communication is a communication according to a near field communication standard.

6. The communication device according to claim 4,
wherein the communication device is configured to receive a registration instruction instructing registration with the server from the terminal device via the second wireless communication using the second identification information obtained from the communication device, and wherein the communication device-side controller is configured, in response to obtain the registration instruction, to:

connect to the server via the second wireless communication; and register information of the communication device with the server.

7. The communication device according to claim 6,
wherein the communication device-side controller is configured to update the first identification information at every particular period and to update the first identification information when the second identification information is set.

8. The communication device according to claim 4,
wherein the communication device is a printing device configured to perform printing on a sheet using a colorant,
wherein the communication device is configured to receive a print instruction, and
wherein the communication device-side controller is configured to perform printing based on the print instruction obtained from the terminal device.

9. The communication device according to claim 4, wherein the communication device is configured to receive the server-side identification information,
wherein, when the server-side identification information is obtained from the server through the access point via the second wireless communication, the communication device-side controller is configured, in response to the executing the short-range wireless communication, transmit the server-side identification information from the communication device-side short-range wireless communication interface to the terminal device via the short-range wireless communication.

10. A non-transitory computer-readable recording medium for a terminal device having a terminal device-side short-range wireless communication interface configured to perform a short-range wireless communication, a terminal device-side wireless communication interface configured to perform a first wireless communication different from the short-range wireless communication, the first wireless communication is a wireless communication with which the terminal device and a communication device directly perform a communication without any other device configured to relay the communication, and a computer, the non-transitory computer-readable recording medium containing computer-executable instructions which cause, when executed by the computer, the terminal device to perform:
a communication starting process of performing the short-range wireless communication between the terminal device-side short-range wireless communication interface and the communication device;
a first identification information obtaining process of obtaining first connection information and first identification information using the terminal device-side short-range wireless communication interface from the communication device via the short-range wireless communication, the first connection information being used for connection of the first wireless communication, the first identification information being used to identify the terminal device that has performed the communication starting process;

connect with an access point via a second wireless communication using second connection information, the second connection information used to connect to the access point;
transmit first control information from the terminal device-side wireless communication interface to the communication device via the first wireless communication using the first connection information obtained from the communication device, in the first identification information obtaining process, wherein the first control information including the second connection information;
causing the communication device to perform controlling based on the first control information, wherein the communication device is caused to perform a setting to connect to the access point via the second wireless communication based on the first control information,
a first setting instruction transmitting process of transmitting a first setting instruction to set second identification information to the communication device via the second wireless communication with performing an authentication using the first identification information which causes the communication device to transmit identification information, which is different from the first identification information, to identify the terminal device as the second identification information,
wherein the terminal device is further configured to be connected with a server via the second wireless communication,
wherein the computer-executable instructions which cause, when executed by the computer, further cause the terminal device to obtain server-side identification information via the communication device using the second identification information obtained from the communication device, the server-side identification information being set in the server; and
transmit second control information related to the communication device using the server-side identification information, causing the communication device to be controlled based on the second control information, wherein the communication device is associated with the server-side identification information.

11. A communication system, comprising:
a terminal device; and
a communication device,
wherein the terminal device includes:
a terminal device-side short-range wireless communication interface configured to perform a short-range wireless communication;
a terminal device-side wireless communication interface configured to perform a first wireless communication which is a wireless communication different from the short-range wireless communication; and
a terminal device-side controller,
wherein the communication device includes:
a communication device-side short-range wireless communication interface configured to perform the short-range wireless communication;
a communication device-side wireless communication interface configured to perform the first wireless communication, the first wireless communication is a wireless communication with which the terminal device and the communication device directly perform a communication without any other device configured to relay the communication; and
a communication device-side controller, wherein the terminal device-side controller is configured to perform a communication starting process of executing the short-range wireless communication between the terminal device-side short-range wireless communication interface and the communication device-side short-range wireless communication interface, and the terminal device is configured to connect to an access point via a second wireless communication, and the terminal device contains second connection information used to connect to the access point, wherein the communication device-side controller is configured to perform:

in response to execution of the communication starting process, a first identification information transmitting process of transmitting first connection information and first identification information to the terminal device-side short-range wireless communication interface using the communication device-side short-range wireless communication interface via the short-range wireless communication, the first connection information being used for connection of the first wireless communication, the first identification information being used to identify the terminal device that has performed the communication starting process;

a first connection process to establish connection of the first wireless communication with the terminal device based on the first connection information and receive first control information from the terminal device via the first wireless communication, the first control information including the second connection information;

a setting process to perform a setting to connect to the access point via the second wireless communication using the first control information transmitted from the terminal device via the first wireless communication;

an authentication process to authenticate the terminal device based on the first identification information transmitted from the terminal device via the second wireless communication;

a first setting instruction receiving process of receiving a first setting instruction to set second identification information to the communication device via the second wireless communication with performing an authentication using the first identification information in the authentication process; and in response to obtaining the first setting instruction, a second identification information transmitting process of transmitting identification information, which is different from the first identification information, to identify the terminal device as the second identification information, wherein the communication device and the terminal device are further configured to be connected to a server via the second wireless communication, wherein the server is configured to set server-side identification information, wherein the terminal device-side controller is configured to:

obtain the server-side identification information via the communication device using the second identification information obtained from the communication device, where the second identification information is obtained from the communication device and is different from the first identification information; and transmit second control information related to the communication device using the server-side identification information, wherein the server is configured to:

associate the communication device with the server-side identification information in response to transmitting of the server-side identification information to the terminal device; and control, based on the second control information, the communication device associated with the server-side identification information used to transmit the second control information in response to obtaining of the second control information.

12. The communication system according to claim 11, wherein the communication device-side controller is configured to transmit, in response to execution of the authentication using the first identification information, the second identification information to the terminal device via the second wireless communication.

13. The communication system according to claim 12, wherein the terminal device-side controller is configured to transmit a registration instruction instructing registration with the server to the communication device via the second wireless communication using the second identification information obtained from the communication device in the second identification information transmitting process; and wherein the communication device-side controller is configured to perform, in response to obtaining of the registration instruction, connecting to the server via the second wireless communication and register information of the communication device with the server.

14. The communication system according to claim 13, wherein the communication device-side controller is configured to transmit, information to be used to register to the terminal device.

15. The communication system according to claim 11, wherein the terminal device is configured to connect to the server through the access point via the second wireless communication, when the communication device is not connected to the access point, cause the communication device-side controller to transmit the first identification information and the first connection information; and when the communication device is communicable with the server through the access point via the second wireless communication, the server is configured to cause the communication device-side controller to transmit, in response to receiving the short-range wireless communication from the terminal device, the server-side identification information obtained from the server from the communication device-side short-range wireless communication interface to the terminal device-side short-range wireless communication interface via the short-range wireless communication.

16. A transmission method of a communication system including:

a terminal device; and a communication device, wherein the terminal device includes:

a terminal device-side short-range wireless communication interface configured to perform a short-range wireless communication;

a terminal device-side wireless communication interface configured to perform a first wireless communication which is a wireless communication different from the short-range wireless communication, the first wireless communication is a wireless communication with which the terminal device and the communication device directly perform a communication without any other device configured to relay the communication; and
a terminal device-side controller,
wherein the terminal device is configured to connect to an access point via a second wireless communication, and contains second connection information used to connect to the access point,
wherein the communication device includes:
a communication device-side short-range wireless communication interface configured to perform the short-range wireless communication;
a communication device-side wireless communication interface configured to perform the first wireless communication; and
a communication device-side controller,
wherein the method includes:
executing, with the terminal device-side controller, to perform the short-range wireless communication between the terminal device-side short-range wireless communication interface and the communication device-side short-range wireless communication interface;
transmitting, by the communication device-side controller, first connection information and first identification information to the terminal device-side short-range wireless communication interface using the communication device-side short-range wireless communication interface via the short-range wireless communication, the first connection information being used for connection of the first wireless communication, the first identification information used to identify the terminal device executing the short-range wireless communication;
transmitting, by the terminal device-side controller, first control information from the terminal device-side wireless communication interface to the communication device-side wireless communication interface via the first wireless communication using the first connection information obtained from the communication device, the second connection information being transmitted as the first control information;
controlling, by the communication device-side controller, the communication device based on the first control information obtained from the terminal device;
setting, by the communication device-side controller, to connect to the access point via the second wireless communication based on the first control information obtained from the terminal device;
transmitting, by the terminal device-side controller, a first setting instruction to set second identification information to the communication device via the second wireless communication with performing an authentication using the first identification information;
transmitting, by the communication device-side controller in response to obtaining the first setting instruction, identification information, which is different from the first identification information, to identify the terminal device as the second identification information;
connecting the terminal device and the communication device to a server via the second wireless communication;
setting, by the server, server-side identification information;
obtaining, by the terminal device-side controller, the server-side identification information via the communication device using the second identification information obtained from the communication device, where the second identification information is obtained from the communication device and is different from the first identification information;
transmitting, by the terminal device-side controller, second control information related to the communication device using the server-side identification information;
associating, by the server, the communication device with the server-side identification information in response to transmitting of the server-side identification information to the terminal device; and
controlling, by the server, based on the second control information, the communication device associated with the server-side identification information used to transmit the second control information in response to obtaining of the second control information.

* * * * *